United States Patent
Zhang et al.

(10) Patent No.: US 10,999,038 B2
(45) Date of Patent: May 4, 2021

(54) METHOD FOR CONFIGURING RESOURCE OF DOWNLINK MEASUREMENT REFERENCE SIGNAL AND APPARATUS

(71) Applicant: Huawei Technologies Co., Ltd., Shenzhen (CN)

(72) Inventors: Leiming Zhang, Beijing (CN); Yifan Liu, Shenzhen (CN); Ming Lei, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/504,036

(22) Filed: Jul. 5, 2019

(65) Prior Publication Data

US 2019/0334682 A1    Oct. 31, 2019

Related U.S. Application Data

(63) Continuation of application No. PCT/CN2017/115706, filed on Dec. 12, 2017.

(30) Foreign Application Priority Data

Jan. 6, 2017 (CN) .......................... 201710011425.6

(51) Int. Cl.
  *H04W 72/04* (2009.01)
  *H04L 5/00* (2006.01)
(52) U.S. Cl.
  CPC .......... *H04L 5/0053* (2013.01); *H04L 5/0037* (2013.01); *H04L 5/0051* (2013.01); *H04W 72/048* (2013.01)
(58) Field of Classification Search
  CPC ... H04L 5/0007; H04L 5/0037; H04L 5/0039; H04L 5/0042; H04L 5/0044; H04L 5/0051; H04L 5/0053; H04L 5/0094; H04L 27/2611; H04W 72/04; H04W 72/0406;
  (Continued)

(56) References Cited

U.S. PATENT DOCUMENTS

| 8,526,393 | B1 | 9/2013 | Dinan |
| 9,999,074 | B2* | 6/2018 | Moon .................. H04B 7/0626 |
| 10,516,513 | B2* | 12/2019 | Grant .................... H04L 5/0044 |

(Continued)

FOREIGN PATENT DOCUMENTS

| CN | 102404854 A | 4/2012 |
| CN | 103313391 A | 9/2013 |

(Continued)

OTHER PUBLICATIONS

Ericsson, "Further discussion on CSI-RS pooling," 3GPP TSG-RAN WG1 #87, R1-1612352, Reno, Nevada, Nov. 14-18, 2016, 6 pages.

(Continued)

*Primary Examiner* — Frank Duong
(74) *Attorney, Agent, or Firm* — Slater Matsil, LLP

(57) ABSTRACT

A method for configuring a resource of a downlink measurement reference signal and an apparatus are disclosed. In the method, the base station may notify a terminal device of a resource pool by using configuration information of the resource pool that is determined based on the basic pattern or available resources, so that resource configuration of a downlink measurement reference signal is implemented.

21 Claims, 14 Drawing Sheets

(58) Field of Classification Search
CPC ........... H04W 72/044; H04W 72/0446; H04W 72/0453; H04W 72/048; H04W 72/1289
See application file for complete search history.

(56) References Cited

U.S. PATENT DOCUMENTS

| | | | |
|---|---|---|---|
| 10,587,377 B2* | 3/2020 | Yum | ............... H04L 5/0057 |
| 10,720,972 B2* | 7/2020 | Park | ............... H04B 7/063 |
| 2013/0003672 A1 | 1/2013 | Dinan | |
| 2014/0073336 A1 | 3/2014 | Kang | |
| 2017/0180194 A1* | 6/2017 | Noh | ............... H04L 5/0048 |
| 2018/0034613 A1 | 2/2018 | Liu et al. | |
| 2018/0191526 A1 | 7/2018 | Xu | |

FOREIGN PATENT DOCUMENTS

| | | |
|---|---|---|
| CN | 105356978 A | 2/2016 |
| JP | 2015532819 A | 11/2015 |
| WO | 2016161736 A1 | 10/2016 |

OTHER PUBLICATIONS

Ericsson, "Aperiodic CSI and CSI-RS resource pooling," 3GPP TSG-RAN WG1 *86bis, R1-1609763, Lisbon, Portugal, Oct. 10-14, 2016, 4 pages.

ITRI, "Discussion on frequency domain reduced overhead CSI-RS," 3GPP TSG RAN WG1 Meeting #86b, R1-1609407, Lisbon, Portugal, Oct. 10-14, 2016, 2 pages.

Ericsson, "CSI-RS Design for Class A FD-MIMO," 3GPP TSG-RAN WG1#82BIS, R1-155675, Malmö, Sweden, Oct. 5-9, 2015, 8 pages.

"3rd Generation Partnership Project; Technical Specification Group Radio Access Network; Evolved Universal Terrestrial Radio Access (E-UTRA); Physical channels and modulation (Release 14)," 3GPP TS 36.211, V14.1.0, Technical Specification, Dec. 2016, 175 pages.

Ericsson, "CSI-RS design" 3GPP TSG-RAN WG1 #87, R1-1612330, Nov. 14-18, 2016, 6 pages, Reno, Nevada.

"3rd Generation Partnership Project; Technical Specification Group Radio Access Network; Evolved Universal Terrestrial Radio Access (E-UTRA); Radio Resource Control (RRC); Protocol specification, (Release 10)", Technical Specification, 3GPP TS 36.331 V10.5.0, Mar. 2012, 302 pages.

Catt, "Discussion on CSI-RS overhead reduction", 3GPP TSG RAN WG1, Meeting #84bis, R1-162230, Apr. 11-15, 2016, 4 pages, Busan, S. Korea.

Intel Corporation, "Didcussion on CSI-RS for Class A FD-MIMO", 3GPP TSG RAN WG1, Meeting #84bis, R1-162367, Apr. 11-15, 2016, 5 pages, Busan, Korea.

* cited by examiner

Resources in available resources

Resources not in the available resources

METHOD FOR CONFIGURING RESOURCE OF DOWNLINK MEASUREMENT REFERENCE SIGNAL AND APPARATUS

CROSS-REFERENCE TO RELATED APPLICATIONS

This application is a continuation of International Application No. PCT/CN2017/115706, filed on Dec. 12, 2017, which claims priority to Chinese Patent Application No. 201710011425.6, filed on Jan. 6, 2017. The disclosures of the aforementioned applications are hereby incorporated by reference in their entireties.

TECHNICAL FIELD

This application relates to the field of communications technologies, and in particular, to a method for configuring a resource of a downlink measurement reference signal and an apparatus.

BACKGROUND

A multiple-input multiple-output (MIMO) technology is used as a physical-layer multi-antenna technology for improving transmission quality and efficiency of a communications system, and is widely applied in a new generation communications system. Currently, a long term evolution (LTE) system supports a plurality of MIMO technologies such as transmit diversity, spatial multiplexing, and beamforming (BF), and supports more antenna ports (for example, eight antenna ports, 16 antenna ports, or 32 antenna ports).

To support the MIMO technologies, a pilot signal solution in the communications system changes adaptively. In downlink MIMO of the communications system, a downlink pilot signal (or referred to as a downlink reference signal) includes a downlink measurement reference signal (for example, a channel state information-reference signal (CSI-RS)).

A conventional CSI-RS transmission process is as follows. A base station sends CSI-RS resource configuration information to a terminal device; and the terminal device determines, based on the CSI-RS resource configuration information, a resource (that is, a CSI-RS resource) that can be used by the base station to send a CSI-RS, and detects, on the CSI-RS resource, the CSI-RS sent by the base station. In this way, the terminal device can measure channel information (for example, a channel quality indicator (CQI) and a precoding matrix indicator (PMI)) based on the received CSI-RS.

In the CSI-RS transmission method, the CSI-RS resource configuration information generally is represented in a form of a bitmap. Because one subframe includes 168 (12*14=168) resource elements (RE), and each RE in the subframe requires one bit to indicate whether the RE is an available CSI-RS resource, the bitmap generally needs 168 bits.

It can be learned from the foregoing description that the CSI-RS resource configuration information (that is, the bitmap) sent by the base station generally needs 168 bits, and apparently, overheads required by the base station to transmit the CSI-RS resource configuration information are relatively high.

SUMMARY

This application provides a method for configuring a resource of a downlink measurement reference signal and an apparatus, to resolve a prior-art problem that overheads required by a base station to transmit resource configuration information of a downlink measurement reference signal are relatively high.

Specific technical solutions provided in this application are as follows.

According to a first aspect, an embodiment of this application provides a method for configuring a resource of a downlink measurement reference signal, where the method includes the following steps. A base station determines configuration information of a resource pool based on a preset basic pattern or preset available resources, and sends the determined configuration information of the resource pool to a terminal device. The resource pool includes at least one resource that can be used to transmit a downlink measurement reference signal, the basic pattern includes at least one group of basic elements, and the basic element includes two resource elements that are adjacent in a time domain direction or a frequency domain direction.

According to the foregoing method, the base station sends, to the terminal device, the configuration information of the resource pool that is determined based on the preset basic pattern or available resources, so that the terminal device can determine the resource pool based on the locally preset basic pattern or available resources and based on the configuration information. The resource pool includes at least one resource that can be used to transmit the downlink measurement reference signal. The base station may notify the terminal device of the resource pool by using the configuration information of the resource pool that is determined based on the basic pattern or the available resources, so that resource configuration of a downlink measurement reference signal is implemented, and there is no need to notify the terminal device of resource configuration of the downlink measurement reference signal by using a conventional bitmap. Therefore, overheads for resource configuration information of the downlink measurement reference signal are reduced.

In a possible design, the basic pattern or the available resources are agreed on by the base station and the terminal device or are stipulated in a protocol.

According to the foregoing method, after the base station sends, to the terminal device, the configuration information determined based on the basic pattern or the available resources, the resource pool that is determined by the terminal device based on the basic pattern or the available resources and based on the configuration information is consistent with a resource pool determined by the base station.

In a possible design, the base station and the terminal device may pre-agree on a plurality of basic patterns, and before determining the configuration information, the base station selects one basic pattern from the plurality of basic patterns, and sends identifier information of the selected basic pattern to the terminal device.

According to the foregoing method, when the base station and the terminal device agree on the plurality of basic patterns, a basic pattern used in current resource configuration is determined.

In a possible design, the base station determines the configuration information of the resource pool in the following two manners.

In a first manner, the base station receives configuration information of the resource pool that is entered by a user or obtains designated configuration information of the resource pool.

In a second manner, the base station obtains configuration information that is of the resource pool and that is stored for the basic pattern.

According to the foregoing method, the base station may flexibly determine the configuration information of the resource pool.

In a possible design, after the base station determines the configuration information of the resource pool, the base station determines the resource pool based on the basic pattern and the configuration information.

According to the foregoing method, the base station may determine the resource pool, so that the base station can select a target resource from the resource pool to send the downlink measurement reference signal.

In a possible design, the configuration information includes a target multiple and a deviation value, where the target multiple is an integer not equal to 0, and the deviation value is an integer not equal to 0.

According to the foregoing method, because the configuration information of the resource pool includes several pieces of information such as the target multiple and the deviation value, the configuration information of the resource pool needs a relatively small amount of data. Compared with a current technology in which a 168-bit bitmap is usually needed, the data amount of the configuration information of the resource pool is greatly reduced. Apparently, according to the foregoing method, overheads for resource configuration information of the downlink measurement reference signal can be greatly reduced.

In a possible design, based on the content of the configuration information of the resource pool in the foregoing design, the base station may determine the resource pool based on the basic pattern and the configuration information by using the following steps. The base station extends resources in the basic pattern in the time domain direction or the frequency domain direction by the target multiple, to obtain a basic resource pool. The base station then enables the basic resource pool to deviate in the time domain direction and/or the frequency domain direction based on the deviation value, to obtain the resource pool.

According to the foregoing method, the base station may perform extension processing and deviation processing on the basic pattern based on the configuration information, to obtain the resource pool.

In a possible design, the configuration information includes a first target multiple, a second target multiple, and a deviation value, where the first target multiple and the second target multiple both are integers not equal to 0, and the deviation value is an integer not equal to 0.

According to the foregoing method, because the configuration information of the resource pool includes several pieces of information such as the target multiples and the deviation value, the configuration information of the resource pool needs a relatively small amount of data. Compared with a current technology in which a 168-bit bitmap is usually needed, the data amount of the configuration information of the resource pool is greatly reduced. Apparently, according to the foregoing method, overheads for resource configuration information of the downlink measurement reference signal can be greatly reduced.

In a possible design, based on the content of the configuration information of the resource pool in the foregoing design, the base station may determine the resource pool based on the basic pattern and the configuration information by using the following steps. The base station extends resources in the basic pattern in a first direction by the first target multiple, to obtain a first basic resource pool; continues to extend the first basic resource pool in a second direction by the second target multiple, to obtain a second basic resource pool. Finally, the base station enables the second basic resource pool to deviate in the time domain direction and/or the frequency domain direction based on the deviation value, to obtain the resource pool, where the first direction is the time domain direction or the frequency domain direction, and the second direction is another direction other than the first direction in the time domain direction and the frequency domain direction.

According to the foregoing method, the base station may perform extension processing and deviation processing on the basic pattern based on the configuration information, to obtain the resource pool.

In a possible design, a positive value or a negative value of the target multiple, the first target multiple, or the second target multiple in the configuration information in the foregoing designs may indicate an extension direction and/or a relationship between locations obtained before and after extension. Similarly, a positive value or a negative value of the deviation value may indicate a deviation direction and/or a relationship between locations obtained before and after deviation.

According to the foregoing method, the base station may perform extension processing and deviation processing on the basic pattern based on the extension multiple and the deviation value in the configuration information and according to indicated directions, to accurately obtain the resource pool.

In a possible design, the available resources include all resources that can be used to transmit the downlink measurement reference signal in a subframe, and the configuration information of the resource pool is used to indicate a location of the resource pool in the available resources.

In the foregoing case, the configuration information of the resource pool is used to indicate the location of the resource pool in the available resources, and a quantity M of resources in the available resources is less than a quantity 168 of resources included in an entire subframe. Therefore, a data amount used for the configuration information of the resource pool is generally M bits, and the configuration information of the resource pool needs a relatively small amount of data. Compared with a current technology in which a 168-bit bitmap is usually needed, the data amount of the configuration information of the resource pool is greatly reduced. Apparently, according to the foregoing method, overheads for resource configuration information of the downlink measurement reference signal can be greatly reduced.

In a possible design, based on the content of the configuration information in the foregoing embodiment, in this case, the base station determines the configuration information of the resource pool based on the available resources by using the following steps. The base station determines the resource pool in the available resources, and then determines the configuration information of the resource pool based on the location of the resource pool in the available resources.

According to the foregoing method, the base station may determine the configuration information for the available resources.

In a possible design, based on the foregoing two possible designs, the configuration information of the resource pool is a bitmap.

According to the foregoing method, the terminal device may determine the resource pool in the agreed available resources based on the configuration information of the resource pool.

According to a second aspect, an embodiment of this application further provides a method for configuring a resource of a downlink measurement reference signal, where the method includes the following steps. After receiving configuration information of a resource pool that is sent by a base station, a terminal device determines the resource pool based on a preset basic pattern or preset available resources and based on the configuration information. The resource pool includes at least one resource that can be used to transmit a downlink measurement reference signal, the basic pattern includes at least one group of basic elements, and the basic element includes two resource elements that are adjacent in a time domain direction or a frequency domain direction.

According to the foregoing method, after receiving the configuration information of the resource pool that is determined by the base station based on the preset basic pattern or available resources, the terminal device may determine the resource pool based on the locally preset basic pattern or available resources and based on the configuration information. The resource pool includes at least one resource that can be used to transmit the downlink measurement reference signal. The base station may notify the terminal device of the resource pool by using the configuration information of the resource pool that is determined based on the basic pattern or the available resources, so that resource configuration of a downlink measurement reference signal is implemented, and there is no need to notify the terminal device of resource configuration of the downlink measurement reference signal by using a conventional bitmap. Therefore, overheads for resource configuration information of the downlink measurement reference signal are reduced.

In a possible design, the basic pattern or the available resources are agreed on by the base station and the terminal device or are stipulated in a protocol.

According to the foregoing method, it can be ensured that the resource pool that is determined by the terminal device based on the basic pattern or the available resources and based on the configuration information is consistent with a resource pool determined by the base station.

In a possible design, the configuration information includes a target multiple and a deviation value, where the target multiple is an integer not equal to 0, and the deviation value is an integer not equal to 0.

According to the foregoing method, because the configuration information of the resource pool includes several pieces of information such as the target multiple and the deviation value, the configuration information of the resource pool needs a relatively small amount of data. Compared with a current technology in which a 168-bit bitmap is usually needed, the data amount of the configuration information of the resource pool is greatly reduced. Apparently, according to the foregoing method, overheads for resource configuration information of the downlink measurement reference signal can be greatly reduced.

In a possible design, based on the content of the configuration information of the resource pool in the foregoing design, the terminal device may determine the resource pool based on the basic pattern and the configuration information by using the following steps. The terminal device extends resources in the basic pattern in the time domain direction or the frequency domain direction by the target multiple, to obtain a basic resource pool. Then the terminal enables the basic resource pool to deviate in the time domain direction and/or the frequency domain direction based on the deviation value, to obtain the resource pool.

According to the foregoing method, the terminal device may perform extension processing and deviation processing on the basic pattern based on the configuration information, to obtain the resource pool.

In a possible design, the configuration information includes a first target multiple, a second target multiple, and a deviation value, where the first target multiple and the second target multiple both are integers not equal to 0, and the deviation value is an integer not equal to 0.

According to the foregoing method, because the configuration information of the resource pool includes several pieces of information such as the target multiples and the deviation value, the configuration information of the resource pool needs a relatively small amount of data. Compared with a current technology in which a 168-bit bitmap is usually needed, the data amount of the configuration information of the resource pool is greatly reduced. Apparently, according to the foregoing method, overheads for resource configuration information of the downlink measurement reference signal can be greatly reduced.

In a possible design, based on the content of the configuration information of the resource pool in the foregoing design, the terminal device may determine the resource pool based on the basic pattern and the configuration information by using the following steps.

The terminal device extends resources in the basic pattern in a first direction by the first target multiple, to obtain a first basic resource pool; continues to extend the first basic resource pool in a second direction by the second target multiple, to obtain a second basic resource pool; and finally, enables the second basic resource pool to deviate in the time domain direction and/or the frequency domain direction based on the deviation value, to obtain the resource pool, where the first direction is the time domain direction or the frequency domain direction, and the second direction is another direction other than the first direction in the time domain direction and the frequency domain direction.

According to the foregoing method, the terminal device may perform extension processing and deviation processing on the basic pattern based on the configuration information, to obtain the resource pool.

In a possible design, a positive value or a negative value of the target multiple, the first target multiple, or the second target multiple in the configuration information in the foregoing designs may indicate an extension direction and/or a relationship between locations obtained before and after extension. Similarly, a positive value or a negative value of the deviation value may indicate a deviation direction and/or a relationship between locations obtained before and after deviation.

According to the foregoing method, the terminal device may perform extension processing and deviation processing on the basic pattern based on a positive value or a negative value of the extension multiple and a positive value or a negative value of the deviation value in the configuration information and according to indicated directions, to accurately obtain the resource pool.

In a possible design, the available resources include all resources that can be used to transmit the downlink measurement reference signal in a subframe, and the configuration information of the resource pool is used to indicate a location of the resource pool in the available resources.

In the foregoing case, the configuration information of the resource pool is used to indicate the location of the resource pool in the available resources, and a quantity M of resources in the available resources is less than a quantity 168 of resources included in an entire subframe. Therefore, a data amount used for the configuration information of the resource pool is generally M bits, and the configuration information of the resource pool needs a relatively small amount of data. Compared with a current technology in which a 168-bit bitmap is usually needed, the data amount of the configuration information of the resource pool is greatly reduced. Apparently, according to the foregoing method, overheads for resource configuration information of the downlink measurement reference signal can be greatly reduced.

In a possible design, based on the foregoing design, the configuration information of the resource pool is a bitmap.

According to the foregoing method, the terminal device may determine the resource pool in the agreed available resources based on the configuration information of the resource pool.

In a possible design, the terminal device stores a correspondence between a resource pool and two pieces of information: a basic pattern and configuration information of a resource pool, and the terminal device may directly determine, based on the correspondence, the resource pool that corresponds to the basic pattern agreed on with the base station and the received configuration information of the resource pool.

According to the foregoing method, when the terminal device and the base station agree on the basic pattern, the terminal device may determine the resource pool based on the preset basic pattern and the configuration information.

According to a third aspect, an embodiment of this application further provides a base station. The base station has a function of implementing behavior of the base station in the foregoing method example. The function may be implemented by hardware, or may be implemented by hardware executing corresponding software. The hardware or software includes one or more modules corresponding to the function.

In a possible design, a structure of the base station includes a processing unit and a sending unit. The units may execute corresponding functions in the method example. For details, refer to the detailed descriptions in the method example, and details are not described herein again.

In a possible design, a structure of the base station includes a transceiver, a processor, a bus, and a memory. The transceiver is configured to communicate and interact with a terminal device, and the processor is configured to support the base station in executing corresponding functions in the foregoing method. The memory is coupled to the processor, and stores a program instruction and data that are necessary to the base station.

According to a fourth aspect, an embodiment of the present invention further provides a terminal device. The terminal device has a function of implementing behavior of the terminal device in the foregoing method example. The function may be implemented by hardware, or may be implemented by hardware executing corresponding software. The hardware or software includes one or more modules corresponding to the function.

In a possible design, a structure of the terminal device includes a receiving unit and a processing unit. The units may execute corresponding functions in the method example. For details, refer to the detailed descriptions in the method example, and details are not described herein again.

In a possible design, a structure of the terminal device includes a transceiver, a processor, a bus, and a memory. The transceiver is configured to communicate and interact with a base station, and the processor is configured to support the terminal device in executing corresponding functions in the foregoing method. The memory is coupled to the processor, and stores a program instruction and data that are necessary to the terminal device.

According to a fifth aspect, an embodiment of this application further provides a communications system. The communications system includes a base station and a terminal device.

According to a sixth aspect, an embodiment of this application further provides a first non-transient computer storage medium, storing a computer executable instruction. The computer executable instruction is used to perform the method for configuring, by a base station, a resource of a downlink measurement reference signal in this application.

According to a seventh aspect, an embodiment of this application further provides a second non-transient computer storage medium, storing a computer executable instruction. The computer executable instruction is used to perform the method for configuring, by a terminal device, a resource of a downlink measurement reference signal in this application.

According to an eighth aspect, an embodiment of this application further provides a first computer program product. The computer program product includes a computer program stored in the foregoing first non-transient computer storage medium. The computer program includes a program instruction. When the program instruction is executed by a computer, the computer performs the method for configuring a resource of a downlink measurement reference signal in this application.

According to a ninth aspect, an embodiment of this application further provides a second computer program product. The computer program product includes a computer program stored in the foregoing second non-transient computer storage medium. The computer program includes a program instruction. When the program instruction is executed by a computer, the computer performs the method for configuring a resource of a downlink measurement reference signal in this application.

In the embodiments of this application, the base station sends, to the terminal device, the configuration information of the resource pool that is determined based on the preset basic pattern or available resources, so that the terminal device can determine the resource pool based on the locally preset basic pattern or available resources and based on the configuration information. The resource pool includes at least one resource that can be used to transmit the downlink measurement reference signal. The base station may notify the terminal device of the resource pool by using the configuration information of the resource pool that is determined based on the basic pattern or the available resources, so that resource configuration of a downlink measurement reference signal is implemented, and there is no need to notify the terminal device of resource configuration of the downlink measurement reference signal by using a conventional bitmap. Therefore, overheads for resource configuration information of the downlink measurement reference signal are reduced.

DETAILED DESCRIPTION OF ILLUSTRATIVE EMBODIMENTS

Figure 1:
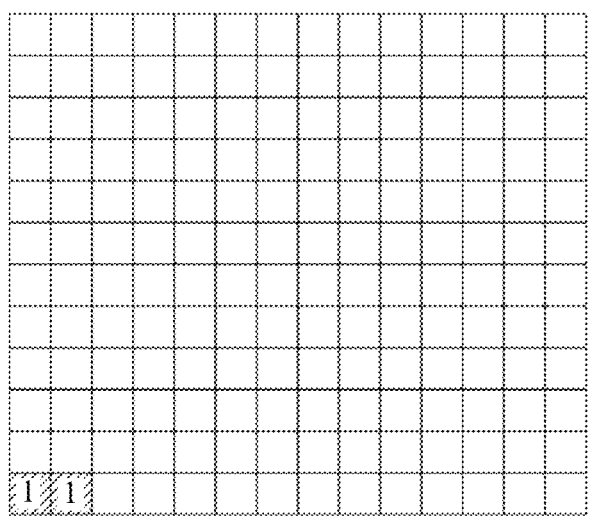
FIG. 1 is a diagram of an example of a first basic pattern according to an embodiment of this application.

The following further describes in detail this application with reference to the accompanying drawings.

The embodiments of this application provide a method for configuring a resource of a downlink measurement reference signal and an apparatus, to resolve a prior-art problem that overheads required by a base station to transmit resource configuration information of a downlink measurement reference signal are relatively high. The method and the apparatus in this application are based on a same inventive concept. Because problem resolving principles of the method and the apparatus are similar, mutual reference may be made to implementations of the apparatus and the method, and repeated parts are not described herein.

In the embodiments of this application, a base station sends, to a terminal device, configuration information of a resource pool that is determined based on a preset basic pattern or preset available resources, so that the terminal device can determine the resource pool based on the locally preset basic pattern or available resources and based on the configuration information. The resource pool includes at least one resource that can be used to transmit a downlink measurement reference signal. The base station may notify the terminal device of the resource pool by using the configuration information of the resource pool that is determined based on the basic pattern or the available resources, so that resource configuration of a downlink measurement reference signal is implemented, and there is no need to notify the terminal device of resource configuration of the downlink measurement reference signal by using a conventional bitmap. Therefore, overheads for resource configuration information of the downlink measurement reference signal are reduced.

The following describes some terms in this application, to help persons skilled in the art have a better understanding.

(1). A base station in the embodiments of this application is a device that connects a terminal device to a wireless network, and includes but is not limited to: an evolved NodeB (eNB), a radio network controller (RNC), a NodeB (NB), a base station controller (BSC), a base transceiver station (BTS), a home NodeB (for example, a Home evolved NodeB or a Home NodeB, HNB), a baseband unit (BBU), and an access point (AP).

(2). A terminal device in this application is also referred to as user equipment (UE), and is a device that provides voice and/or data connectivity for a user, for example, a hand-held device, an in-vehicle device, a wearable device, a computing device, or a mobile station (MS) having a wireless connection function, or another processing device connected to a wireless modem, and a mobile terminal that communicates with one or more core networks through a radio access network.

(3. A resource in this application is a resource in one subframe. In an LTE system, one subframe includes 14 time domain locations (time symbols) and includes 12 frequency domain locations (subcarriers), and a minimum resource granularity (that is, a resource unit) is an RE. When the subframe uses the foregoing division manner, one resource is one RE. For ease of understanding and drawing, only the foregoing resource division manner is used as an example for description in this application.

(4). A basic pattern in this application includes at least one group of basic elements, and the basic element includes two resource elements, namely two REs, that are adjacent in a time domain direction or a frequency domain direction. The basic pattern is a reference used by the base station and/or the terminal device to determine a resource pool. To be specific, when the resource pool is being determined, resources in the basic pattern may be processed (for example, extension and/or deviation) based on configuration information of the resource pool, to obtain the resource pool.

The basic pattern may be set based on different application scenarios or service requirements:

For example, to improve flexibility of the basic pattern, the basic pattern may include only one group of basic elements, as shown in FIG. 1.

Figure 2:
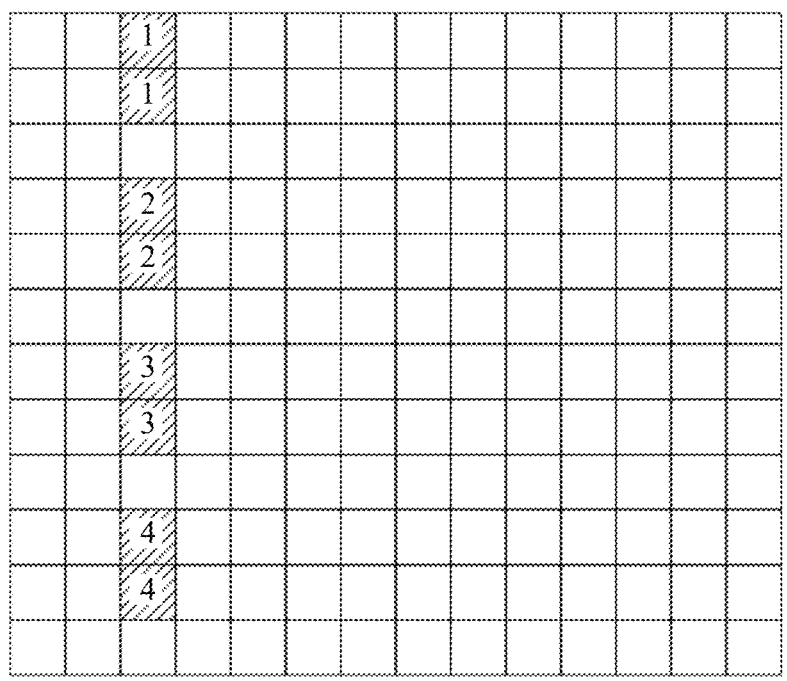
FIG. 2 is a diagram of an example of a second basic pattern according to an embodiment of this application.

For another example, to implement a channel information measurement function, resources in the basic pattern are in a same time domain location, as shown in FIG. 2.

Figure 3:
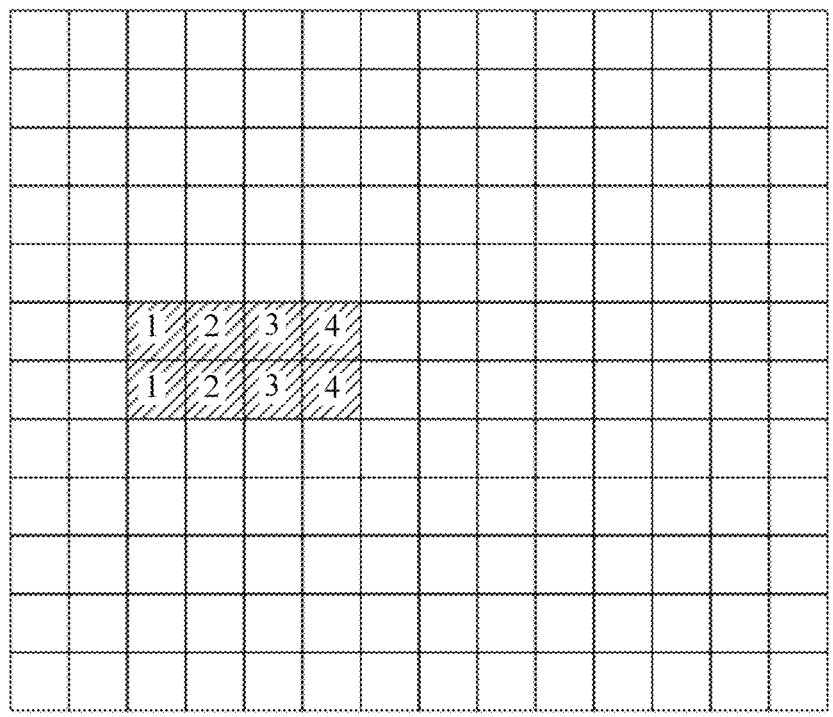
FIG. 3 is a diagram of an example of a third basic pattern according to an embodiment of this application.

For still another example, to implement a beam sweep function, resources in the basic pattern need to occupy a plurality of time domain locations, and occupy one or two frequency domain locations, as shown in FIG. 3.

Figure 4:
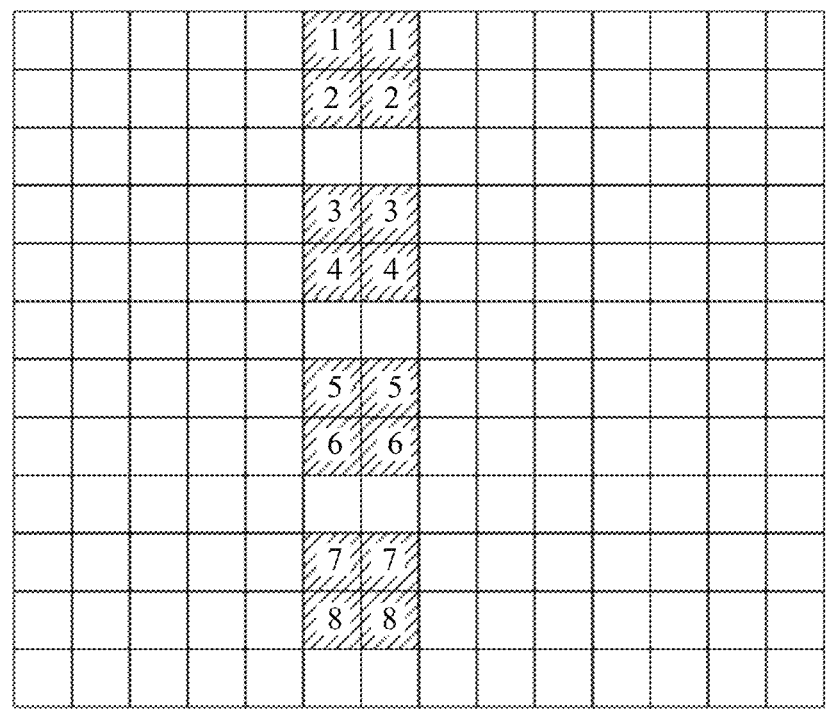
FIG. 4 is a diagram of an example of a fourth basic pattern according to an embodiment of this application.

For still another example, the basic pattern is similar to a basic pattern of a demodulation reference signal (DMRS), as shown in FIG. 4.

It should be noted that in each of the basic patterns in FIG. 1 to FIG. 4, resources identified by using same numbers are a same basic element. In addition, the basic pattern in this application is not limited to the four basic patterns in FIG. 1 to FIG. 4, and the foregoing basic patterns are merely used as examples for description in this application.

Figure 5:
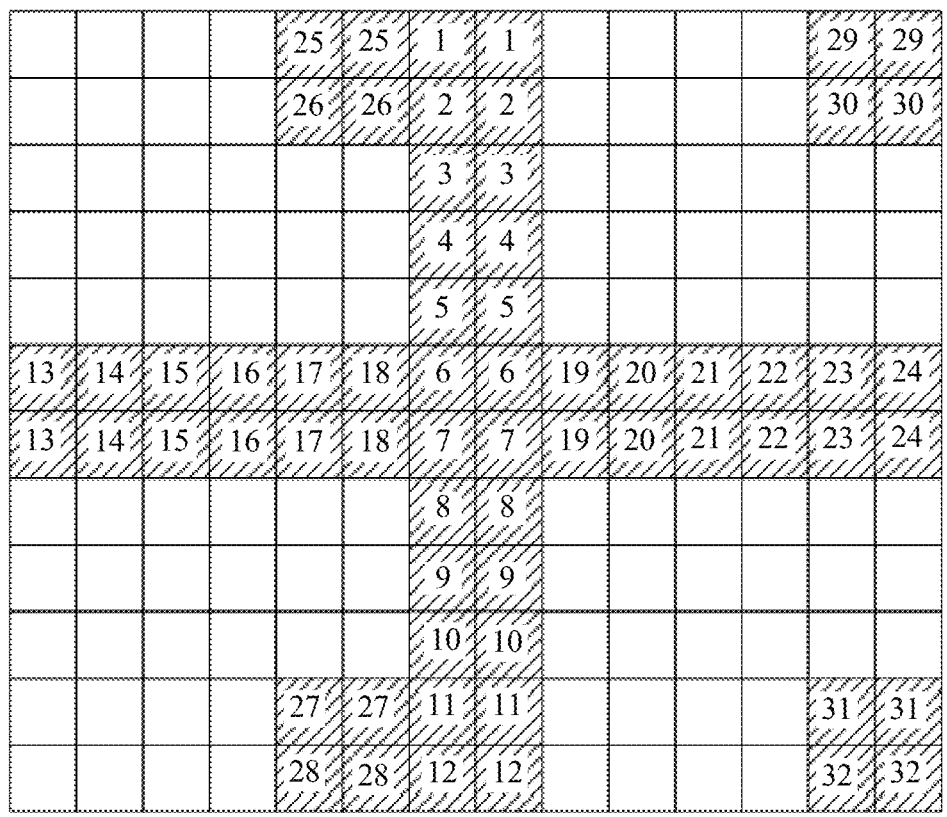
FIG. 5 is a diagram of an example of available resources according to an embodiment of this application.
Figure 5:
Figure 5:

(5). Available resources in this application are stipulated in a protocol, or are resources that are agreed on by the base station and the terminal device. In other words, the base station and the terminal device both can determine resource locations of the available resources. The available resources may include all resources that can be used to transmit a downlink measurement reference signal in a subframe, as shown in FIG. 5, and the base station may select a resource pool for the downlink measurement reference signal in the available resources.

(6). A downlink measurement reference signal in this application is a downlink pilot signal, for example, a CSI-RS, sent by the base station to the terminal device. The terminal device measures various channel information (for example, a CQI and a PMI) based on the downlink measurement reference signal.

(7). The term "and/or" describes an association relationship for describing associated objects and represents that three relationships may exist. For example, A and/or B may represent the following three cases: Only A exists, both A and B exist, and only B exists. The character "/" generally indicates an "or" relationship between associated objects.

In addition, it should be understood that in the descriptions of this application, terms such as "first" and "second" are merely used for distinguishing, should not be understood as indicating or implying relative importance, and should not be understood as indicating or implying a sequence.

Figure 6:
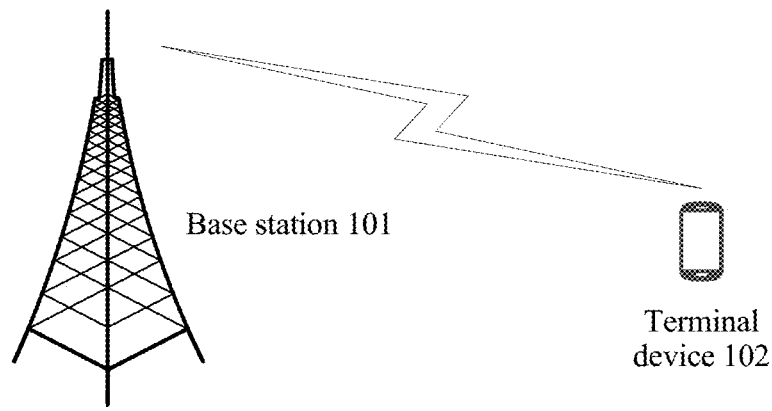
FIG. 6 is an architectural diagram of a communications system according to an embodiment of this application.

The method for configuring a resource of a downlink measurement reference signal provided in the embodiments of this application is applicable to a communications system in FIG. 6. The system includes a base station 101 and a terminal device 102.

In a process of configuring a resource of a downlink measurement reference signal, the following configurations apply. The base station is configured to: determine configuration information of a resource pool based on a preset basic pattern or preset available resources, and send the configuration information to the terminal device. The terminal device is configured to determine the resource pool based on the received configuration information of the resource pool and the preset basic pattern or available resources.

According to the foregoing solution, the base station may notify the terminal device of the resource pool by using the configuration information of the resource pool that is determined based on the basic pattern or the available resources, so that resource configuration of a downlink measurement reference signal is implemented, and there is no need to notify the terminal device of resource configuration of the downlink measurement reference signal by using a conventional bitmap. Therefore, overheads for resource configuration information of the downlink measurement reference signal are reduced.

After the process of configuring a resource of a downlink measurement reference signal, the base station may determine the resource pool based on the basic pattern and the configuration information of the resource pool, or determine the resource pool in the available resources, select, from the resource pool, a target resource used to transmit the downlink measurement reference signal, and send the downlink measurement reference signal by using the target resource.

Optionally, the terminal device may perform monitoring on the resource in the resource pool, to receive the downlink measurement reference signal.

Optionally, after determining the target resource, the base station sends configuration information of the target resource to the terminal device, where the configuration information of the target resource is used to indicate a location of the target resource in the resource pool. The terminal device determines the target resource in the resource pool based on the configuration information of the target resource. The terminal device performs monitoring on the target resource, to receive the downlink measurement reference signal.

After receiving the downlink measurement reference signal, the terminal device may perform channel information measurement based on the downlink measurement reference signal by using a conventional measurement technology.

The base station sends the configuration information of the target resource to the terminal device, so that the terminal device can accurately determine the target resource in the resource pool, to avoid that the terminal device performs monitoring on all resources in the resource pool, thereby reducing power consumption of the terminal device. In addition, the configuration information of the target resource only needs to indicate the location of the target resource in the resource pool, and does not need to indicate a location of the target resource in an entire subframe, thereby greatly reducing a data amount needed by the configuration information of the target resource. Therefore, according to the foregoing method, overheads for configuration information of the target resource of the downlink measurement reference signal can be reduced.

Figure 7:
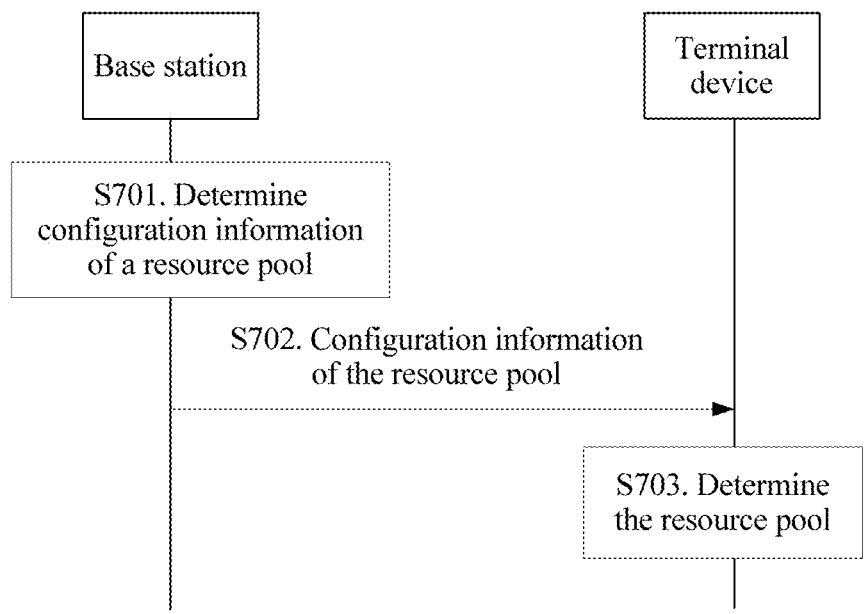
FIG. 7 is a flowchart of a method for configuring a resource of a downlink measurement reference signal according to an embodiment of this application.

To describe the technical solutions of the embodiments of this application more clearly, the following describes, with reference to FIG. 7, a process of the method for configuring a resource of a downlink measurement reference signal in the embodiments of this application. The method is applied to the communications system in FIG. 6. As shown in FIG. 7, a processing process of the method includes the following steps.

S701. A base station determines configuration information of a resource pool based on a preset basic pattern or preset available resources.

The resource pool includes at least one resource that can be used to transmit a downlink measurement reference signal, the basic pattern includes at least one group of basic elements, and the basic element includes two resource elements that are adjacent in a time domain direction or a frequency domain direction. The available resources include all resources that can be used to transmit the downlink measurement reference signal in a subframe.

Optionally, the basic pattern or the available resources are agreed on by the base station and a terminal device, or are agreed in a protocol.

Optionally, the base station and the terminal device may pre-agree on a plurality of basic patterns, for example, four basic patterns in FIG. 1 to FIG. 4, and then the base station and the terminal device further need to agree on a specifically used basic pattern in the plurality of basic patterns. A specific agreeing process is: The base station selects one basic pattern from the plurality of basic patterns, and sends identifier information of the basic pattern to the terminal device.

Optionally, the base station may send the identifier information of the selected basic pattern when performing S702, or may send the identifier information of the basic pattern before determining the configuration information of the resource pool.

Optionally, when the basic pattern is preset in the base station, the determining, by a base station, configuration information of a resource pool includes: receiving, by the base station, configuration information of the resource pool that is entered by a user or obtaining designated configuration information of the resource pool; or obtaining, by the base station, configuration information that is of the resource pool and that is stored for the basic pattern.

Optionally, in the foregoing case, the configuration information of the resource pool includes information such as a multiple for extension processing and a deviation value. The extension multiple is an integer not equal to 0, and the deviation value is an integer not equal to 0. In this way, the base station and the terminal device may perform extension processing and deviation processing on resources in the basic pattern based on the extension multiple and the deviation value, to obtain the resource pool.

In the foregoing case, because the configuration information of the resource pool includes several pieces of information such as the target multiple and the deviation value, the configuration information of the resource pool needs a relatively small amount of data. Compared with a current technology in which a 168-bit bitmap is usually needed, the data amount of the configuration information of the resource pool is greatly reduced. Apparently, according to the foregoing method, overheads for resource configuration information of the downlink measurement reference signal can be greatly reduced.

Optionally, when the available resources are preset in the base station, the determining, by a base station, configuration information of a resource pool includes: determining, by the base station, the resource pool in the available resources; and determining, by the base station, the configuration information of the resource pool based on a location of the resource pool in the available resources.

Optionally, the configuration information of the resource pool is used to indicate the location of the resource pool in the available resources. In this way, the terminal device can determine the resource pool in the agreed available resources based on the configuration information of the resource pool.

Optionally, the configuration information of the resource pool may be represented in a form of a bitmap, and the bitmap only needs to indicate whether each RE in the available resources is a resource in the resource pool. For example, the available resources are shown in FIG. 5, and when the resource pool selected by the base station in the available resources includes resources numbered 17, 18, 20, and 21, a value of the configuration information (the bitmap) of the resource pool is 0000000000000001101100000000000.

In the foregoing case, the configuration information of the resource pool is used to indicate the location of the resource pool in the available resources, and a quantity M of resources in the available resources is less than a quantity 168 of resources included in an entire subframe. Therefore, a data amount used for the configuration information of the resource pool is generally M bits, and the configuration information of the resource pool needs a relatively small amount of data. Compared with a current technology in which a 168-bit bitmap is usually needed, the data amount of the configuration information of the resource pool is greatly reduced. Apparently, according to the foregoing method, overheads for resource configuration information of the downlink measurement reference signal can be greatly reduced.

S702. The base station sends the configuration information of the resource pool to a terminal device.

Optionally, the base station may add the configuration information of the resource pool to physical layer signaling or higher layer signaling, and send the physical layer signal or the higher layer signaling to the terminal device.

S703. The terminal device determines the resource pool based on the preset basic pattern or available resources and based on the configuration information.

It can be learned from the description of the basic pattern in S701 that when the terminal device and the base station agree on the basic pattern, the configuration information includes the extension multiple and the deviation value. The extension multiple is an integer not equal to 0, and the deviation value is an integer not equal to 0.

A location of a resource includes two directions: a time domain direction and a frequency domain direction. Therefore, the extension multiple and the deviation value each have directivity. Based on this, the extension multiple may be implemented in the following two manners.

In a first manner, the extension multiple is a target multiple in a first specified direction in the foregoing two directions. The first specified direction is set or agreed for the basic pattern.

In a second manner, the extension multiple includes a first target multiple in a first direction and a second target multiple in a second direction. The first direction is the time domain direction or the frequency domain direction, and the second direction is another direction other than the first direction in the time domain direction and the frequency domain direction.

Similarly, the deviation value may also be implemented in the following two manners.

In a first manner, the deviation value is a deviation value in a second specified direction in the foregoing two directions. The second specified direction is set or agreed for the basic pattern.

In a second manner, the deviation value includes a first deviation value in a third direction and a second deviation value in a fourth direction. The third direction is the time domain direction or the frequency domain direction, and the fourth direction is another direction other than the third direction in the time domain direction and the frequency domain direction.

Optionally, extension directions and deviation directions specified or agreed for different types of basic patterns are shown in the following Table 1.

TABLE 1

| Type of a basic pattern | Extension direction | Deviation direction |
|---|---|---|
| Longitudinal (as shown in FIG. 2) | Horizontal | Horizontal (preferred)/longitudinal (second choice) |
| Horizontal (as shown in FIG. 3) | Longitudinal | Longitudinal (preferred)/horizontal (second choice) |
| Similar to a basic pattern of a DMRS (as shown in FIG. 4) | Horizontal | Horizontal (preferred)/longitudinal (second choice) |

It should be noted that in the table, "horizontal" indicates a time domain direction of a resource, and "longitudinal" indicates a frequency domain direction of a resource.

Figure 8:
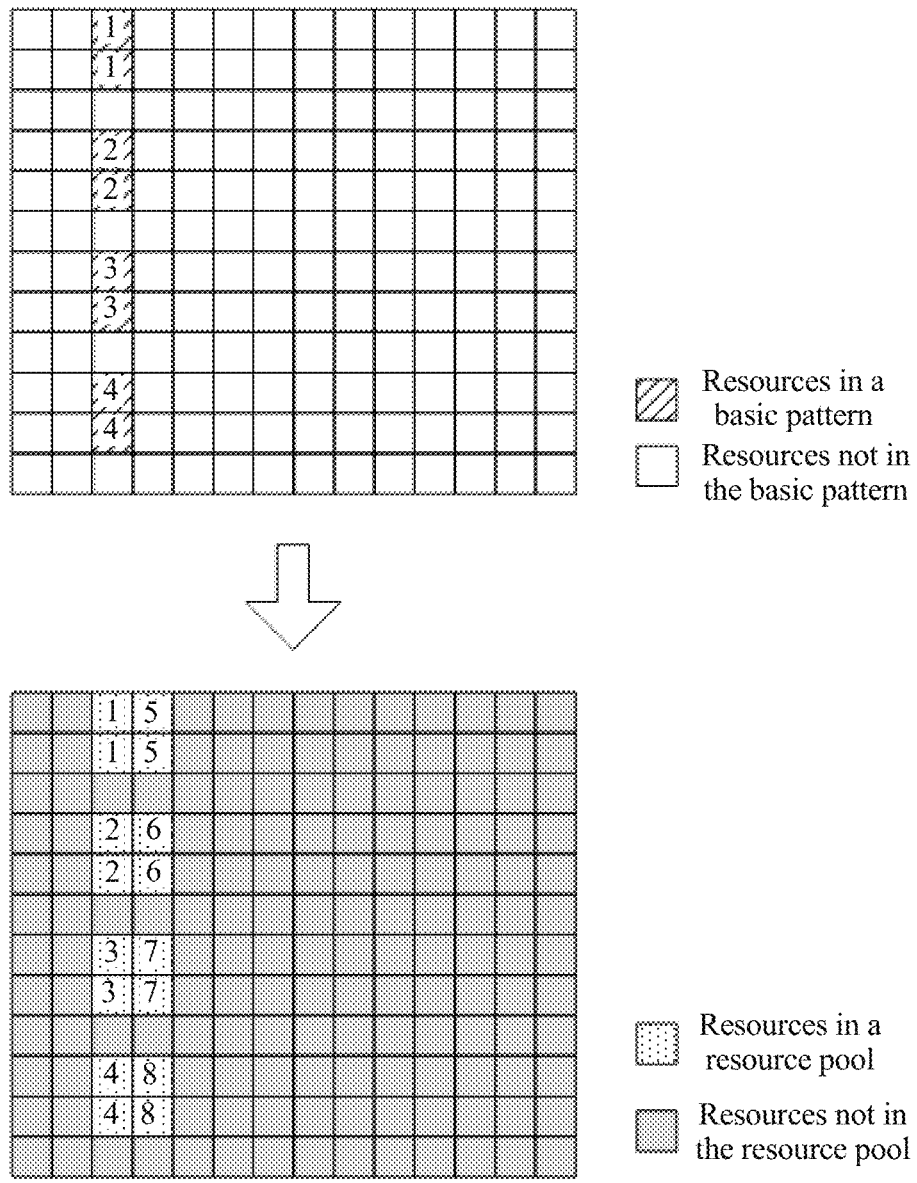
FIG. 8 is a diagram of an example of extending a basic pattern according to an embodiment of this application.

In addition, the base station and the terminal device not only agree on the extension direction and the deviation direction, but also need to agree on a relationship between locations obtained before and after extension and a relationship between locations obtained before and after deviation. For example, for the basic pattern in FIG. 2, if resources are extended to twice the resources, the base station extends the resources in the basic pattern rightwards in the time domain direction to twice the resources, as shown in FIG. 8. Certainly, when the base station performs extension processing, extension may be performed leftwards in the time domain direction, or may be performed upwards or downwards in the frequency domain direction. The relationship between locations obtained before and after deviation during deviation processing is similar to the relationship between locations obtained before and after extension, and details are not described herein again.

The extension multiple and the deviation value each may be a positive integer or a negative integer. Optionally, when the extension multiple is a positive integer, the base station and the terminal device need to agree on an extension direction and a relationship between locations obtained before and after extension. Optionally, when the extension multiple may be a positive integer or a negative integer, the base station and the terminal device may indicate, by using a positive value or a negative value of the extension multiple, an agreed extension direction and/or an agreed relationship between locations obtained before and after extension.

Similarly, when the deviation value is a positive integer, the base station and the terminal device need to agree on a deviation direction and a relationship between locations obtained before and after deviation. Optionally, when the deviation value may be a positive integer or a negative integer, the base station and the terminal device may indicate, by using a positive value or a negative value of the deviation value, an agreed deviation direction and/or an agreed relationship between locations obtained before and after deviation.

When the extension multiple in the configuration information is implemented in the foregoing first manner, the determining, by the terminal device, the resource pool based on the basic pattern and the configuration information includes: extending, by the terminal device, resources in the basic pattern in the time domain direction or the frequency domain direction (that is, the first specified direction) by the target multiple, to obtain a basic resource pool; and enabling, by the terminal device, the basic resource pool to deviate in the time domain direction and/or the frequency domain direction (when the deviation value is implemented in the foregoing first manner, a deviation direction is the second specified direction; when the deviation value is implemented in the foregoing second manner, there are two deviation directions) based on the deviation value, to obtain the resource pool.

Figure 9:
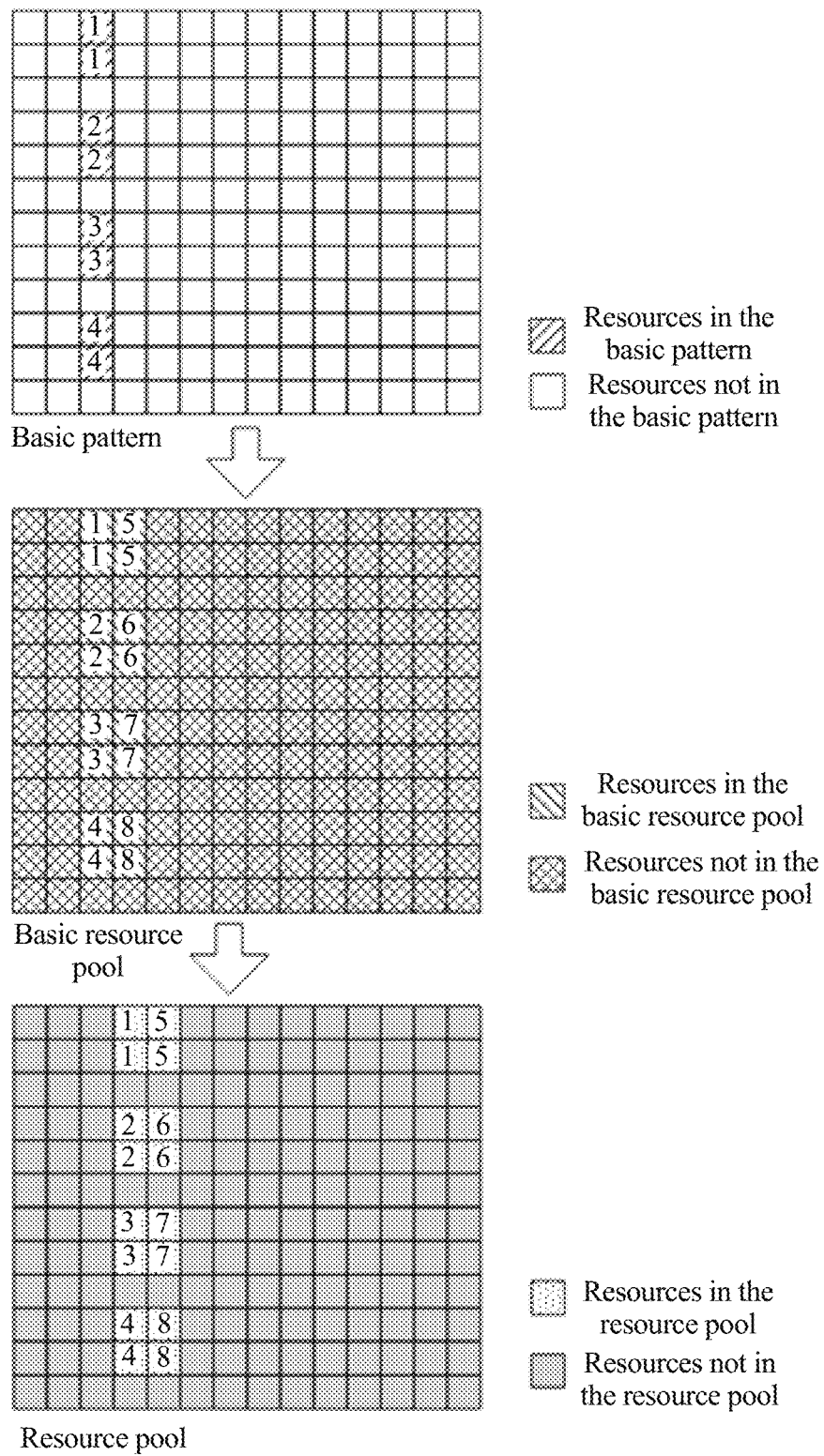
FIG. 9 is a diagram of a first example of determining a resource pool according to an embodiment of this application.

In example 1, when the basic pattern agreed on by the base station and the terminal device is the basic pattern in FIG. 2, and in the configuration information of the resource pool, the target multiple is 1 and the deviation value is 1, as shown in FIG. 9, a process of determining, by the terminal device, the resource pool includes: extending, by the terminal device, resources in the basic pattern in an agreed extension direction (the time domain direction, rightwards) to twice the resources, to obtain a basic resource pool; and then enabling, by the base station, the basic resource pool to deviate by one time domain location based on an agreed deviation direction (the time domain direction, rightwards), to obtain the final resource pool.

Figure 10:
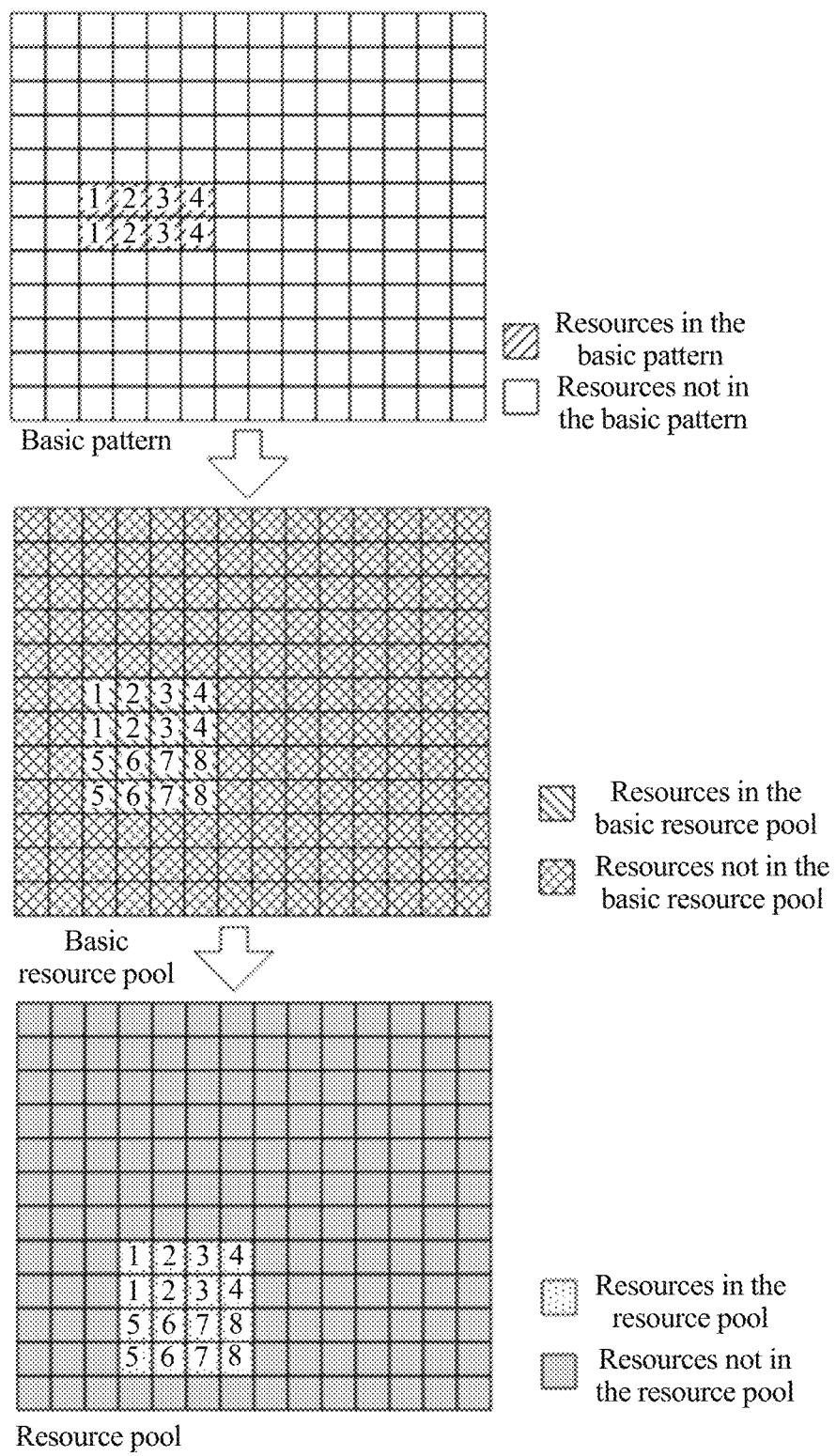
FIG. 10 is a diagram of a second example of determining a resource pool according to an embodiment of this application.

In example 2, when the basic pattern agreed on by the base station and the terminal device is the basic pattern in FIG. 3, and in the configuration information of the resource pool, the target multiple is 1 and the deviation value includes a first deviation value 1 in the time domain direction and a second deviation value 2 in the frequency domain direction, as shown in FIG. 10, a process of determining, by the terminal device, the resource pool includes: extending, by the terminal device, resources in the basic pattern in an agreed extension direction (the frequency domain direction, downwards) to twice the resources, to obtain a basic resource pool; and then enabling, by the base station, the basic resource pool to deviate by one time domain location in the time domain direction (rightwards), and by two frequency domain locations in the frequency domain direction (downwards), to obtain the final resource pool. It should be noted that this embodiment of this application does not limit a sequence of deviation processing in the time domain direction and the frequency domain direction.

Figure 11:
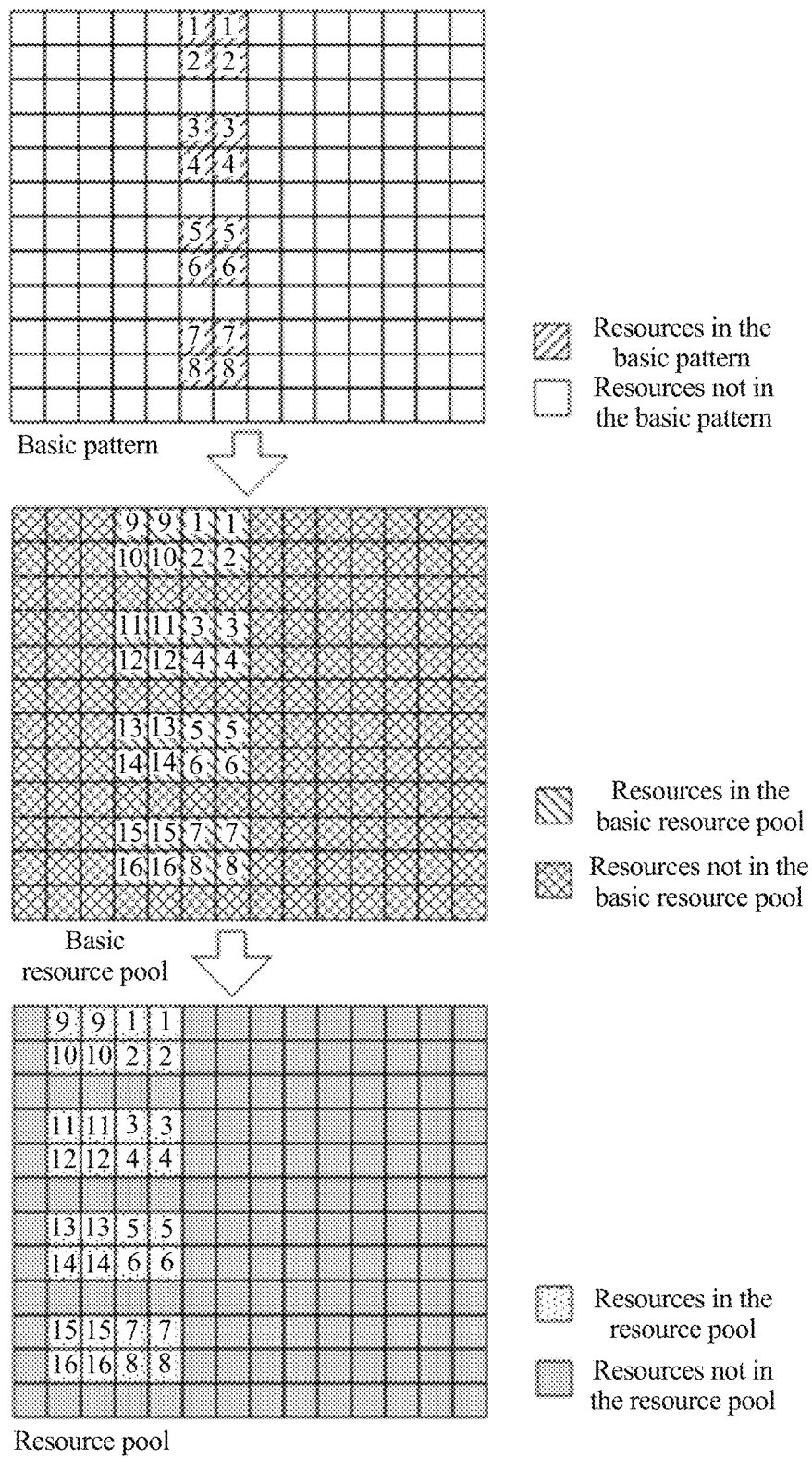
FIG. 11 is a diagram of a third example of determining a resource pool according to an embodiment of this application.

In example 3, when the basic pattern agreed on by the base station and the terminal device is the basic pattern in FIG. 4, and in the configuration information of the resource pool, the target multiple is 1 and the deviation value is 2, as shown in FIG. 11, a process of determining, by the terminal device, the resource pool includes: extending, by the terminal device, resources in the basic pattern in an agreed extension direction (the time domain direction, leftwards) to twice the resources, to obtain a basic resource pool; and then enabling, by the base station, the basic resource pool to deviate by two time domain locations based on an agreed deviation direction (the time domain direction, leftwards), to obtain the final resource pool.

When the extension multiple in the configuration information is implemented in the foregoing second manner, the determining, by the terminal device, the resource pool based on the basic pattern and the configuration information includes: extending, by the terminal device, resources in the basic pattern in the first direction by the first target multiple, to obtain a first basic resource pool;

continuing to extend the first basic resource pool in the second direction by the second target multiple, to obtain a second basic resource pool; and enabling, by the terminal device, the second basic resource pool to deviate in the time domain direction and/or the frequency domain direction based on the deviation value, to obtain the resource pool.

Figure 12:
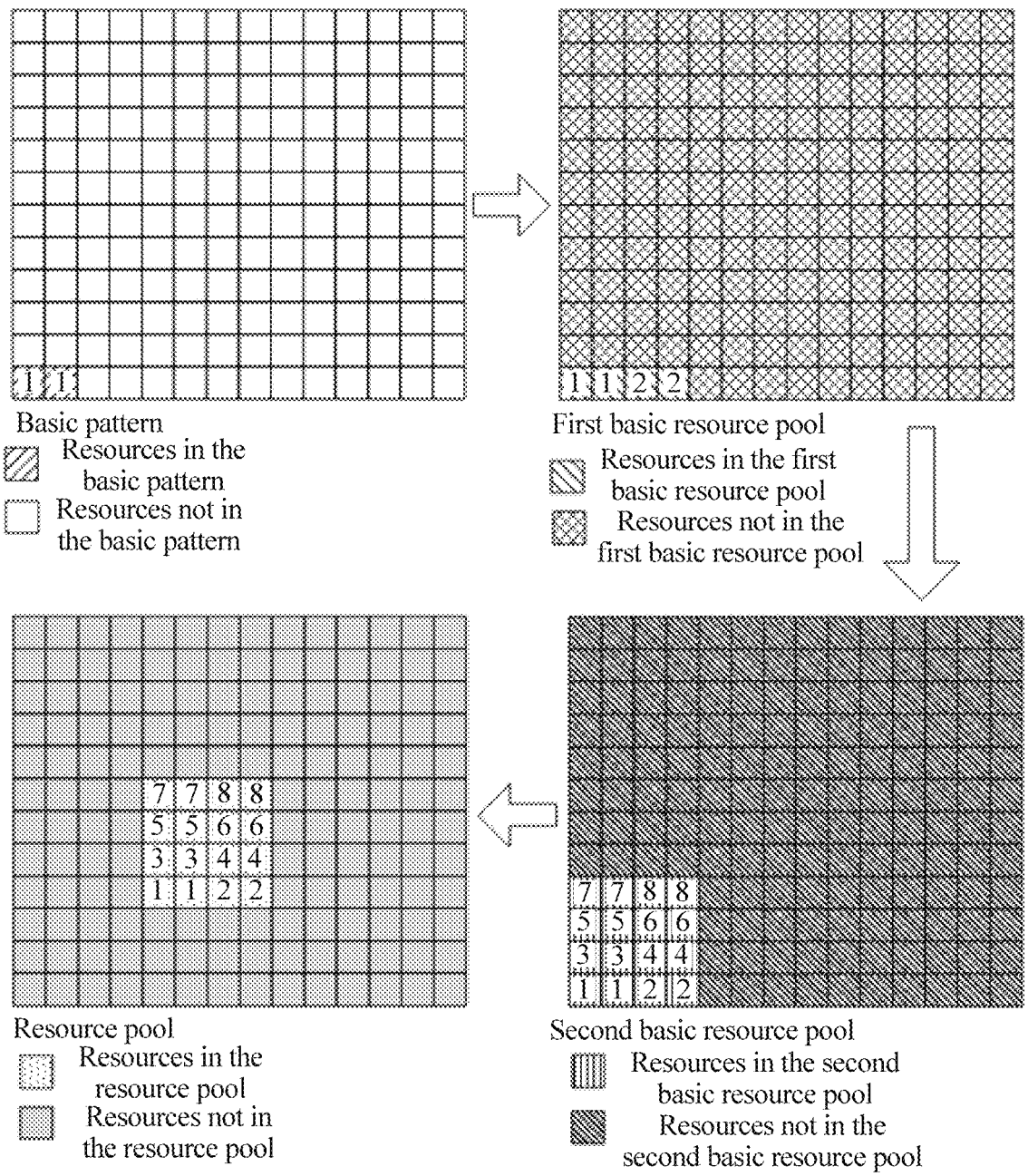
FIG. 12 is a diagram of a fourth example of determining a resource pool according to an embodiment of this application.

In example 4, when the basic pattern agreed on by the base station and the terminal device is the basic pattern in FIG. 1, and in the configuration information of the resource pool, the extension multiple includes a first target multiple 1 in the time domain direction and a second target multiple 3 in the frequency domain direction, and the deviation value includes a first deviation value 4 in the time domain direction and a second deviation value 3 in the frequency domain direction, as shown in FIG. 12, a process of determining, by the terminal device, the resource pool includes: extending, by the terminal device, resources in the basic pattern in the time domain direction (rightwards) to twice the resources, to obtain a first basic resource pool; continuing, by the terminal device, to extend resources in the first basic resource pool in the frequency domain direction (upwards) to four times the resources, to obtain a second basic resource pool; and then enabling, by the base station, the second basic resource pool to deviate by four time domain locations in the time domain direction (rightwards), and by three frequency domain locations in the frequency domain direction (upwards), to obtain the final resource pool.

It should be noted that this embodiment of this application does not limit a sequence of extension processing and deviation processing in the time domain direction and the frequency domain direction.

Optionally, in a scenario in which the terminal device stores a correspondence between a resource pool and two pieces of information: a basic pattern and configuration information of a resource pool, the terminal device may further directly determine, based on the correspondence, the resource pool that corresponds to the basic pattern agreed on with the base station and the received configuration information of the resource pool.

According to the foregoing method, when the terminal device and the base station agree on the basic pattern, the terminal device may determine the resource pool based on the preset basic pattern and the configuration information.

It can be learned from the description of the available resources in S701 that when the terminal device and the base station agree on the available resources, the configuration information may indicate the location of the resource pool in the available resources. In this way, after receiving the configuration information, the terminal device can determine the resource pool in the available resources based on the configuration information.

Figure 13:
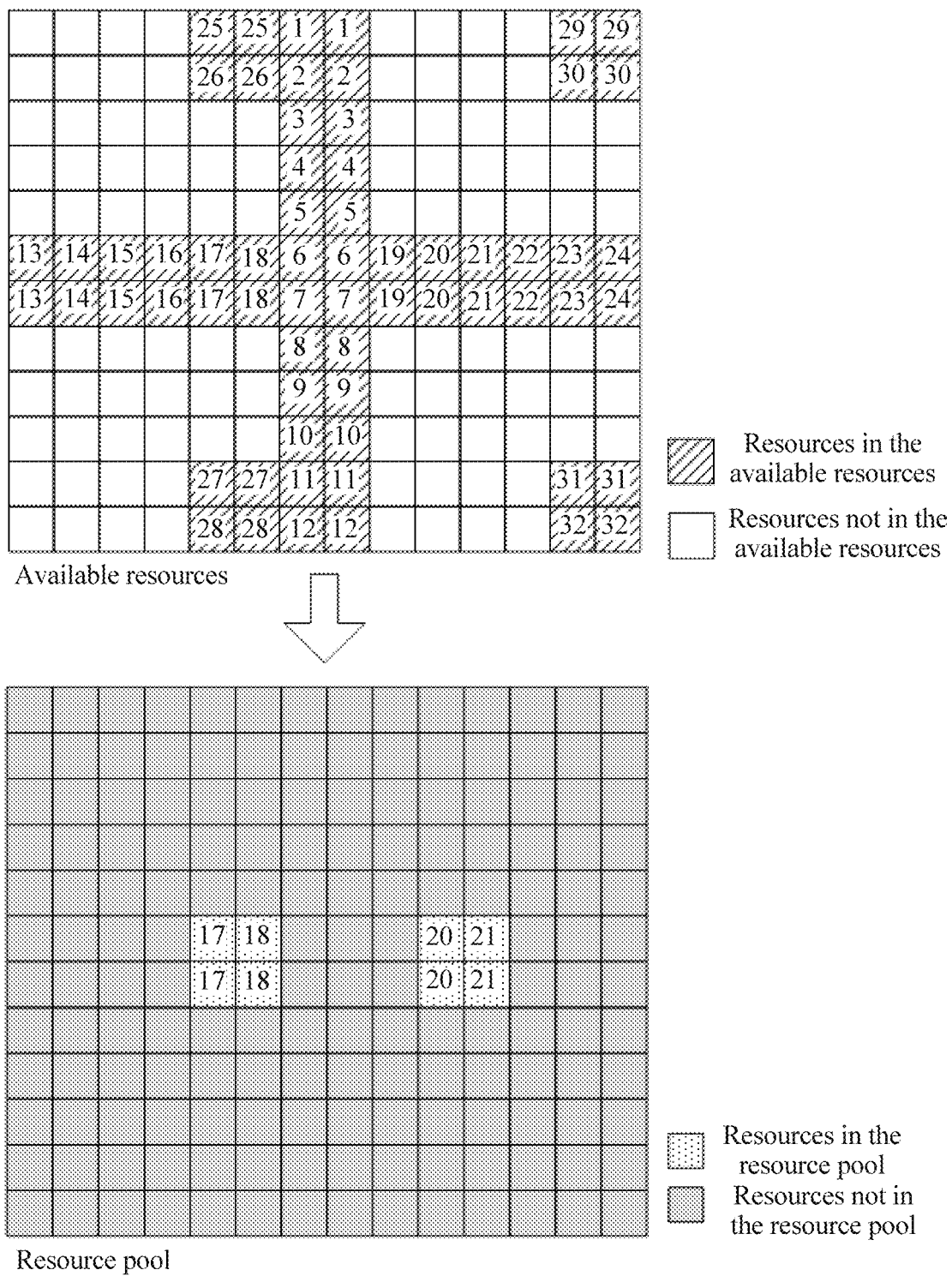
FIG. 13 is a diagram of a fifth example of determining a resource pool according to an embodiment of this application.

In example 5, when the available resources are available resources in FIG. 5, the configuration information of the resource pool is in a form of a bitmap, and a value is 00000000000000001101100000000000, the terminal device may determine, based on the value, that resources numbered 17, 18, 20, and 21 are resources in the resource pool, as shown in FIG. 13.

According to the foregoing method, when the terminal device and the base station agree on the available resources, the terminal device can determine the resource pool based on the preset available resources and the configuration information.

According to the method for configuring a resource of a downlink measurement reference signal in this application, the base station sends, to the terminal device, the configuration information of the resource pool that is determined based on the preset basic pattern or available resources, so that the terminal device can determine the resource pool based on the locally preset basic pattern or available resources and based on the configuration information. The resource pool includes at least one resource that can be used to transmit the downlink measurement reference signal. The base station may notify the terminal device of the resource pool by using the configuration information of the resource pool that is determined based on the basic pattern or the available resources, so that resource configuration of a downlink measurement reference signal is implemented, and there is no need to notify the terminal device of resource configuration of the downlink measurement reference signal by using a conventional bitmap. Therefore, overheads for resource configuration information of the downlink measurement reference signal are reduced.

After the base station and the terminal device in the communications system use the resource configuration of the downlink measurement reference signal in the foregoing embodiment, the base station and the terminal device may perform a downlink measurement reference signal transmission process, including the following two cases.

In a first case, the base station and the terminal device agree on the basic pattern After determining the configuration information of the resource pool in S701, the base station determines the resource pool based on the basic pattern and the configuration information of the resource pool. For a specific process of determining, by the base station, the resource pool, refer to the process of determining, by the terminal device, the resource pool in S703, and details are not described herein again.

The base station selects a target resource from the resource pool.

The base station sends the downlink measurement reference signal by using the target resource. After determining the resource pool in S703, the terminal device may perform monitoring on all resources in the resource pool, to receive the downlink measurement reference signal.

Alternatively, the base station sends configuration information of the target resource to the terminal device, where the configuration information of the target resource is used to indicate a location of the target resource in the resource pool. The terminal device determines, based on the configuration information of the target resource, the target resource in the resource pool determined in S703, and performs monitoring on the target resource, to receive the downlink measurement reference signal.

In a second case, the base station and the terminal device agree on the available resources:

The base station selects the resource pool in the available resources in a process of determining the configuration information of the resource pool in S701.

Subsequently, a process in which the base station selects a target resource from the resource pool and transmits the downlink measurement reference signal is the same as the process in the first case, and details are not described herein again.

According to the foregoing method, after configuring the resource of the downlink measurement reference signal, the base station and the terminal device transmit the downlink measurement reference signal.

Figure 14:
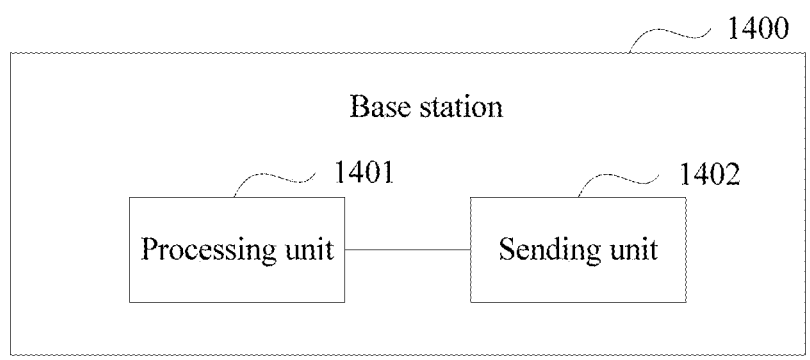
FIG. 14 is a structural diagram of a base station according to an embodiment of this application.

Based on the foregoing embodiments, an embodiment of this application provides a base station. The base station is applied to the communications system in FIG. 6, and is configured to implement the method for configuring a resource of a downlink measurement reference signal in FIG. 7. As shown in FIG. 14, the base station 1400 includes a processing unit 1401 and a sending unit 1402.

The processing unit 1401 is configured to determine configuration information of a resource pool based on a preset basic pattern or preset available resources, where the resource pool includes at least one resource that can be used to transmit a downlink measurement reference signal, the basic pattern includes at least one group of basic elements, and the basic element includes two resource elements that are adjacent in a time domain direction or a frequency domain direction.

The sending unit 1402 is configured to send the configuration information of the resource pool to a terminal device.

Optionally, the basic pattern or the available resources are agreed on by the base station and the terminal device.

Optionally, the processing unit 1401 is further configured to: after determining the configuration information of the resource pool, determine the resource pool based on the basic pattern and the configuration information.

Optionally, the configuration information includes a target multiple and a deviation value, where the target multiple is an integer not equal to 0, and the deviation value is an integer not equal to 0.

When determining the resource pool based on the basic pattern and the configuration information, the processing unit 1401 is specifically configured to: extend resources in the basic pattern in the time domain direction or the frequency domain direction by the target multiple, to obtain a basic resource pool; and enable the basic resource pool to deviate in the time domain direction and/or the frequency domain direction based on the deviation value, to obtain the resource pool.

Optionally, the configuration information includes a first target multiple, a second target multiple, and a deviation value, where the first target multiple and the second target multiple both are integers not equal to 0, and the deviation value is an integer not equal to 0.

When determining the resource pool based on the basic pattern and the configuration information, the processing unit 1401 is specifically configured to: extend resources in the basic pattern in a first direction by the first target multiple, to obtain a first basic resource pool; continue to extend the first basic resource pool in a second direction by the second target multiple, to obtain a second basic resource pool, where the first direction is the time domain direction or the frequency domain direction, and the second direction is another direction other than the first direction in the time domain direction and the frequency domain direction; and enable the second basic resource pool to deviate in the time domain direction and/or the frequency domain direction based on the deviation value, to obtain the resource pool.

Optionally, the available resources include all resources that can be used to transmit the downlink measurement reference signal in a subframe, and the configuration information of the resource pool is used to indicate a location of the resource pool in the available resources.

When determining the configuration information of the resource pool based on the available resources, the processing unit 1401 is specifically configured to: determine the resource pool in the available resources; and determine the configuration information of the resource pool based on the location of the resource pool in the available resources.

Optionally, the configuration information of the resource pool is a bitmap.

In this embodiment of this application, the base station sends, to the terminal device, the configuration information of the resource pool that is determined based on the preset basic pattern or available resources, so that the terminal device can determine the resource pool based on the locally preset basic pattern or available resources and based on the configuration information. The resource pool includes at least one resource that can be used to transmit the downlink measurement reference signal. The base station may notify the terminal device of the resource pool by using the configuration information of the resource pool that is determined based on the basic pattern or the available resources, so that resource configuration of a downlink measurement reference signal is implemented, and there is no need to notify the terminal device of resource configuration of the downlink measurement reference signal by using a conventional bitmap. Therefore, overheads for resource configuration information of the downlink measurement reference signal are reduced.

Figure 15:
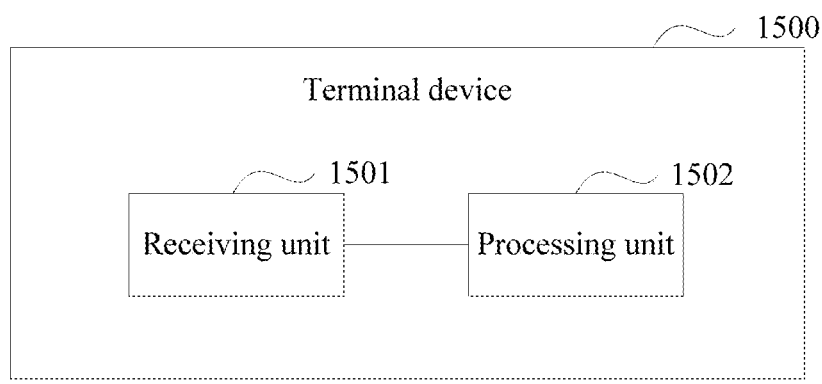
FIG. 15 is a structural diagram of a terminal device according to an embodiment of this application.

Based on the foregoing embodiments, an embodiment of this application provides a terminal device. The terminal device is applied to the communications system in FIG. 6, and is configured to implement the method for configuring a resource of a downlink measurement reference signal in FIG. 7. As shown in FIG. 15, the terminal device 1500 includes a receiving unit 1501 and a processing unit 1502.

The receiving unit 1501 is configured to receive configuration information of a resource pool that is sent by a base station, where the resource pool includes at least one resource that can be used to transmit a downlink measurement reference signal.

The processing unit 1502 is configured to determine the resource pool based on a preset basic pattern or preset available resources and based on the configuration information, where the basic pattern includes at least one group of basic elements, and the basic element includes two resource elements that are adjacent in a time domain direction or a frequency domain direction.

Optionally, the basic pattern or the available resources are agreed on by the base station and the terminal device.

Optionally, the configuration information includes a target multiple and a deviation value, where the target multiple is an integer not equal to 0, and the deviation value is an integer not equal to 0.

When determining the resource pool based on the basic pattern and the configuration information, the processing unit 1502 is specifically configured to: extend resources in the basic pattern in the time domain direction or the frequency domain direction by the target multiple, to obtain a basic resource pool; and enable the basic resource pool to deviate in the time domain direction and/or the frequency domain direction based on the deviation value, to obtain the resource pool.

Optionally, the configuration information includes a first target multiple, a second target multiple, and a deviation value, where the first target multiple and the second target multiple both are integers not equal to 0, and the deviation value is an integer not equal to 0.

When determining the resource pool based on the basic pattern and the configuration information, the processing unit 1502 is specifically configured to: extend resources in the basic pattern in a first direction by the first target multiple, to obtain a first basic resource pool; continue to extend the first basic resource pool in a second direction by the second target multiple, to obtain a second basic resource pool, where the first direction is the time domain direction or the frequency domain direction, and the second direction is another direction other than the first direction in the time domain direction and the frequency domain direction; and enable the second basic resource pool to deviate in the time domain direction and/or the frequency domain direction based on the deviation value, to obtain the resource pool.

Optionally, the available resources include all resources that can be used to transmit the downlink measurement reference signal in a subframe, and the configuration information of the resource pool is used to indicate a location of the resource pool in the available resources.

Optionally, the configuration information of the resource pool is a bitmap bitmap.

In this embodiment of this application, after receiving the configuration information of the resource pool that is determined by the base station based on the preset basic pattern or available resources, the terminal device may determine the resource pool based on the locally preset basic pattern or available resources and based on the configuration information. The resource pool includes at least one resource that can be used to transmit the downlink measurement reference signal. The base station may notify the terminal device of the resource pool by using the configuration information of the resource pool that is determined based on the basic pattern or the available resources, so that resource configuration of a downlink measurement reference signal is implemented, and there is no need to notify the terminal device of resource configuration of the downlink measurement reference signal by using a conventional bitmap. Therefore, overheads for resource configuration information of the downlink measurement reference signal are reduced.

It should be noted that unit division in the embodiments of the present invention is an example, and is merely logical function division. In actual implementation, another division manner may be used. Functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) or a processor to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

Figure 16:
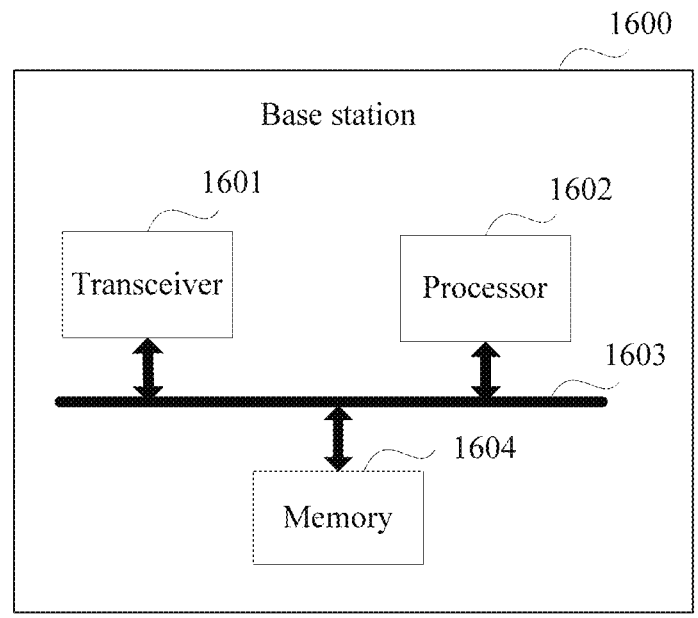
FIG. 16 is a structural diagram of another base station according to an embodiment of this application.

Based on the foregoing embodiments, an embodiment of this application further provides a base station, configured to implement the method for configuring a resource of a downlink measurement reference signal in FIG. 7, and having a function of the base station 1400 in FIG. 14. As shown in FIG. 16, the base station 1600 includes a transceiver 1601, a processor 1602, a bus 1603, and a memory 1604.

The transceiver 1601, the processor 1602, and the memory 1604 may be connected to each other by using the bus 1603. The bus 1603 may be a Peripheral Component Interconnect (PCI) bus, an Extended Industry Standard Architecture (EISA) bus, or the like. The bus may be classified into an address bus, a data bus, a control bus, and the like. For ease of representation, only one thick line is used to represent the bus in FIG. 16, but this does not mean that there is only one bus or only one type of bus.

The transceiver 1601 is configured to communicate and interact with a terminal device.

The processor 1602 is configured to implement the method for configuring a resource of a downlink measurement reference signal in FIG. 7, including: determining configuration information of a resource pool based on a preset basic pattern or preset available resources, where the resource pool includes at least one resource that can be used to transmit a downlink measurement reference signal, the basic pattern includes at least one group of basic elements, and the basic element includes two resource elements that are adjacent in a time domain direction or a frequency domain direction; and sending the configuration information of the resource pool to the terminal device.

Optionally, the basic pattern or the available resources are agreed on by the base station and the terminal device.

Optionally, the processor 1602 is further configured to: after determining the configuration information of the resource pool, determine the resource pool based on the basic pattern and the configuration information.

Optionally, the configuration information includes a target multiple and a deviation value, where the target multiple is an integer not equal to 0, and the deviation value is an integer not equal to 0.

When determining the resource pool based on the basic pattern and the configuration information, the processor 1602 is specifically configured to: extend resources in the basic pattern in the time domain direction or the frequency domain direction by the target multiple, to obtain a basic resource pool; and enable the basic resource pool to deviate in the time domain direction and/or the frequency domain direction based on the deviation value, to obtain the resource pool.

Optionally, the configuration information includes a first target multiple, a second target multiple, and a deviation value, where the first target multiple and the second target multiple both are integers not equal to 0, and the deviation value is an integer not equal to 0.

When determining the resource pool based on the basic pattern and the configuration information, the processor 1602 is specifically configured to: extend resources in the basic pattern in a first direction by the first target multiple, to obtain a first basic resource pool; continue to extend the first basic resource pool in a second direction by the second target multiple, to obtain a second basic resource pool, where the first direction is the time domain direction or the frequency domain direction, and the second direction is another direction other than the first direction in the time domain direction and the frequency domain direction; and enable the second basic resource pool to deviate in the time domain direction and/or the frequency domain direction based on the deviation value, to obtain the resource pool.

Optionally, the available resources include all resources that can be used to transmit the downlink measurement reference signal in a subframe, and the configuration information of the resource pool is used to indicate a location of the resource pool in the available resources.

When determining the configuration information of the resource pool based on the available resources, the processor 1602 is specifically configured to: determine the resource pool in the available resources; and determine the configuration information of the resource pool based on the location of the resource pool in the available resources.

Optionally, the configuration information of the resource pool is a bitmap.

The memory 1604 is configured to store a program and the like. Specifically, the program may include program code, and the program code includes a computer operation instruction. The memory 1604 may include a random access memory (RAM), or may include a non-volatile memory, for example, at least one magnetic memory. The processor 1602 executes the application program stored in the memory 1604, to implement the foregoing function and implement the method for configuring a resource of a downlink measurement reference signal in FIG. 7.

In this embodiment of this application, the base station sends, to the terminal device, the configuration information of the resource pool that is determined based on the preset basic pattern or available resources, so that the terminal device can determine the resource pool based on the locally preset basic pattern or available resources and based on the configuration information. The resource pool includes at least one resource that can be used to transmit the downlink measurement reference signal. The base station may notify the terminal device of the resource pool by using the configuration information of the resource pool that is determined based on the basic pattern or the available resources, so that resource configuration of a downlink measurement reference signal is implemented, and there is no need to notify the terminal device of resource configuration of the downlink measurement reference signal by using a conventional bitmap. Therefore, overheads for resource configuration information of the downlink measurement reference signal are reduced.

Based on the foregoing embodiments, an embodiment of this application provides a terminal device. The terminal device is applied to the communications system in FIG. 6, and is configured to implement the method for configuring a resource of a downlink measurement reference signal in FIG. 7. As shown in FIG. 15, the terminal device 1500 includes a receiving unit 1501 and a processing unit 1502.

Figure 17:
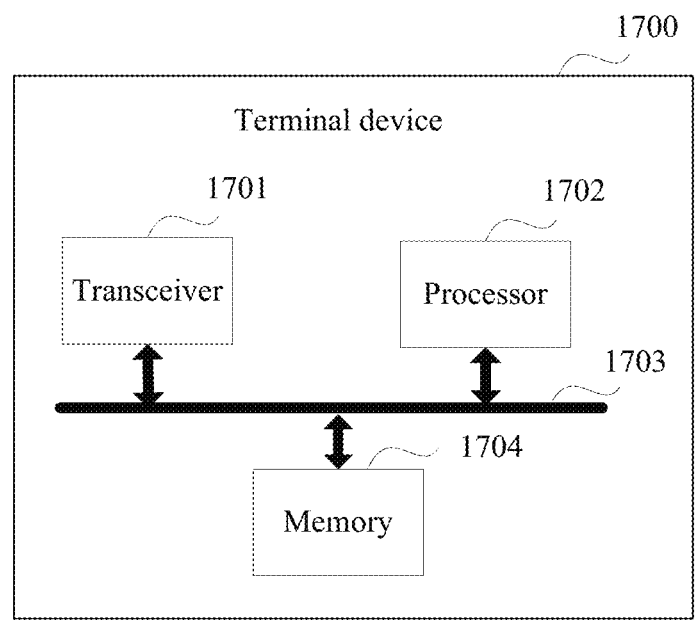
FIG. 17 is a structural diagram of another terminal device according to an embodiment of this application.

Based on the foregoing embodiments, an embodiment of this application further provides a terminal device, configured to implement the method for configuring a resource of a downlink measurement reference signal in FIG. 7, and having a function of the terminal device 1500 in FIG. 15. As shown in FIG. 17, the terminal device includes a transceiver 1701, a processor 1702, a bus 1703, and a memory 1704.

The transceiver 1701, the processor 1702, and the memory 1704 are connected to each other by using the bus 1703. The bus 1703 may be a PCI bus, an EISA bus, or the like. The bus may be classified into an address bus, a data bus, a control bus, and the like. For ease of representation, only one thick line is used to represent the bus in FIG. 17, but this does not mean that there is only one bus or only one type of bus.

The transceiver 1701 is configured to communicate and interact with a base station.

The processor 1702 is configured to implement the method for configuring a resource of a downlink measurement reference signal in FIG. 7, including: receiving configuration information of a resource pool that is sent by the base station, where the resource pool includes at least one resource that can be used to transmit a downlink measurement reference signal; and determining the resource pool based on a preset basic pattern or preset available resources and based on the configuration information, where the basic pattern includes at least one group of basic elements, and the basic element includes two resource elements that are adjacent in a time domain direction or a frequency domain direction.

Optionally, the basic pattern or the available resources are agreed on by the base station and the terminal device.

Optionally, the configuration information includes a target multiple and a deviation value, where the target multiple is an integer not equal to 0, and the deviation value is an integer not equal to 0.

When determining the resource pool based on the basic pattern and the configuration information, the processor 1702 is specifically configured to: extend resources in the basic pattern in the time domain direction or the frequency domain direction by the target multiple, to obtain a basic resource pool; and enable the basic resource pool to deviate in the time domain direction and/or the frequency domain direction based on the deviation value, to obtain the resource pool.

Optionally, the configuration information includes a first target multiple, a second target multiple, and a deviation value, where the first target multiple and the second target multiple both are integers not equal to 0, and the deviation value is an integer not equal to 0.

When determining the resource pool based on the basic pattern and the configuration information, the processor 1702 is specifically configured to: extend resources in the basic pattern in a first direction by the first target multiple, to obtain a first basic resource pool; continue to extend the first basic resource pool in a second direction by the second target multiple, to obtain a second basic resource pool, where the first direction is the time domain direction or the frequency domain direction, and the second direction is another direction other than the first direction in the time domain direction and the frequency domain direction; and enable the second basic resource pool to deviate in the time domain direction and/or the frequency domain direction based on the deviation value, to obtain the resource pool.

Optionally, the available resources include all resources that can be used to transmit the downlink measurement reference signal in a subframe, and the configuration information of the resource pool is used to indicate a location of the resource pool in the available resources.

Optionally, the configuration information of the resource pool is a bitmap bitmap.

The memory 1704 is configured to store a program and the like. Specifically, the program may include program code, and the program code includes a computer operation instruction. The memory 1704 may include a RAM, or may include a non-volatile memory, for example, at least one magnetic memory. The processor 1702 executes the application program stored in the memory 1704, to implement the foregoing function and implement the method for configuring a resource of a downlink measurement reference signal in FIG. 7.

In this embodiment of this application, after receiving the configuration information of the resource pool that is determined by the base station based on the preset basic pattern or available resources, the terminal device may determine the resource pool based on the locally preset basic pattern or available resources and based on the configuration information. The resource pool includes at least one resource that can be used to transmit the downlink measurement reference signal. The base station may notify the terminal device of the resource pool by using the configuration information of the resource pool that is determined based on the basic pattern or the available resources, so that resource configuration of a downlink measurement reference signal is implemented, and there is no need to notify the terminal device of resource configuration of the downlink measurement reference signal by using a conventional bitmap. Therefore, overheads for resource configuration information of the downlink measurement reference signal are reduced.

To sum up, according to the method for configuring a resource of a downlink measurement reference signal and the apparatus in the embodiments of this application, the base station sends, to the terminal device, the configuration information of the resource pool that is determined based on the preset basic pattern or available resources, so that the terminal device can determine the resource pool based on the locally preset basic pattern or available resources and based on the configuration information. The resource pool includes at least one resource that can be used to transmit the downlink measurement reference signal. The base station may notify the terminal device of the resource pool by using the configuration information of the resource pool that is determined based on the basic pattern or the available resources, so that resource configuration of a downlink measurement reference signal is implemented, and there is no need to notify the terminal device of resource configuration of the downlink measurement reference signal by using a conventional bitmap. Therefore, overheads for resource configuration information of the downlink measurement reference signal are reduced.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a magnetic disk memory, a CD-ROM, and an optical memory) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

Although some embodiments of this application have been described, persons skilled in the art can make changes and modifications to these embodiments once they learn the basic inventive concept. Therefore, the following claims are intended to be construed as to cover the preferred embodiments and all changes and modifications falling within the scope of this application.

Apparently, persons skilled in the art can make various modifications and variations to the embodiments of this application without departing from the spirit and scope of the embodiments of the present invention. This application is intended to cover these modifications and variations provided that they fall within the scope of protection defined by the following claims and their equivalent technologies.

What is claimed is:

1. A method, comprising:
   determining, by a base station, configuration information of a resource pool in a subframe based on a preset basic pattern or preset available resources, wherein the resource pool comprises at least one resource that is usable to transmit a downlink measurement reference signal, the preset basic pattern comprises at least one basic element, and the at least one basic element comprises at least two resource elements that are adjacent in a time domain direction or a frequency domain direction; and
   sending, by the base station, the configuration information of the resource pool to a terminal device, wherein a number of resource elements referenced by the configuration information of the resource pool is less than a number of resource elements in the subframe.

2. The method according to claim 1, wherein the preset basic pattern or the preset available resources are known in advance by both the base station and the terminal device.

3. The method according to claim 1, wherein after determining the configuration information of the resource pool, the method further comprises:
   determining, by the base station, the resource pool based on the preset basic pattern and the configuration information.

4. The method according to claim 3, wherein:
   the configuration information comprises a target multiple and a deviation value, wherein the target multiple is a first integer that is not zero (0), and the deviation value is a second integer that is not zero (0); and
   determining, by the base station, the resource pool based on the preset basic pattern and the configuration information comprises:
      extending, by the base station, resources comprised in the preset basic pattern in the time domain direction or the frequency domain direction by the target multiple, to obtain a basic resource pool; and
      enabling, by the base station, the basic resource pool to deviate in the time domain direction or the frequency domain direction based on the deviation value, to obtain the resource pool.

5. The method according to claim 3, wherein:
   the configuration information comprises a first target multiple, a second target multiple, and a deviation value, wherein the first target multiple and the second target multiple are integers that are not zero (0), and the deviation value is an integer that is not zero (0); and
   determining, by the base station, the resource pool based on the preset basic pattern and the configuration information comprises:
      extending, by the base station, resources in the preset basic pattern in a first direction by the first target multiple, to obtain a first basic resource pool;
      extending the first basic resource pool in a second direction by the second target multiple, to obtain a second basic resource pool, wherein the first direction is a first domain direction, the first domain direction is the time domain direction or the frequency domain direction, and the second direction is another direction in the first domain direction that is different than the first direction; and
      enabling, by the base station, the second basic resource pool to deviate in the time domain direction or the frequency domain direction based on the deviation value, to obtain the resource pool.

6. The method according to claim 1, wherein:
   the preset available resources comprise all resources that are usable to transmit the downlink measurement reference signal in the subframe, and the configuration information of the resource pool indicates a location of the resource pool in the preset available resources; and
   determining, by the base station, the configuration information of the resource pool based on the preset available resources comprises:
      determining, by the base station, the resource pool in the preset available resources; and
      determining, by the base station, the configuration information of the resource pool based on the location of the resource pool in the preset available resources.

7. The method according to claim 6, wherein the configuration information of the resource pool is a bitmap.

8. The method of claim 1, wherein the resource pool includes all resources in the subframe that are usable for transmitting the downlink measurement reference signal, wherein a number of subcarriers referenced by the configuration information is less than 12, and wherein the number of resource elements referenced by the configuration information is less than 168, the method further comprising:
selecting, by the base station, a target resource from the resource pool; and
transmitting, by the base station, the downlink measurement reference signal using the target resource.

9. A method, comprising:
receiving, by a terminal device, configuration information of a resource pool in a subframe that is sent by a base station, wherein the resource pool comprises at least one resource that is usable for transmitting a downlink measurement reference signal, wherein a number of resource elements referenced by the configuration information of the resource pool is less than a number of resource elements in the subframe; and
determining, by the terminal device, the resource pool based on a preset basic pattern or preset available resources, and based on the configuration information, wherein the preset basic pattern comprises a basic element, and the basic element comprises at least two resource elements that are adjacent in a time domain direction or a frequency domain direction.

10. The method according to claim 9, wherein the preset basic pattern or the preset available resources are known in advance by both the base station and the terminal device.

11. The method according to claim 9, wherein:
the configuration information comprises a target multiple and a deviation value, wherein the target multiple is a first integer that is not zero (0), and the deviation value is a second integer that is not (0); and
determining, by the terminal device, the resource pool based on the preset basic pattern and the configuration information comprises:
extending, by the terminal device, resources in the preset basic pattern in the time domain direction or the frequency domain direction by the target multiple, to obtain a basic resource pool; and
enabling, by the terminal device, the basic resource pool to deviate in the time domain direction or the frequency domain direction based on the deviation value, to obtain the resource pool.

12. The method according to claim 9, wherein:
the configuration information comprises a first target multiple, a second target multiple, and a deviation value, wherein the first target multiple and the second target multiple both are integers that are not zero (0), and the deviation value is an integer that is not zero (0); and
determining, by the terminal device, the resource pool based on the preset basic pattern and the configuration information comprises:
extending, by the terminal device, resources in the preset basic pattern in a first direction by the first target multiple, to obtain a first basic resource pool;
extending the first basic resource pool in a second direction by the second target multiple, to obtain a second basic resource pool, wherein the first direction is in first domain direction, and the first domain direction is the time domain direction or the frequency domain direction, and the second direction is another direction in the first domain direction that is different than the first direction; and
enabling, by the terminal device, the second basic resource pool to deviate in the time domain direction or the frequency domain direction based on the deviation value, to obtain the resource pool.

13. The method according to claim 9, wherein the preset available resources comprise all resources that are usable for transmitting the downlink measurement reference signal in the subframe, and the configuration information of the resource pool indicates a location of the resource pool in the preset available resources.

14. The method according to claim 13, wherein the configuration information of the resource pool is a bitmap.

15. A terminal device, comprising:
a transceiver, configured to:
receive configuration information of a resource pool in a subframe that is sent by a base station, wherein the resource pool comprises at least one resource that is usable for transmitting a downlink measurement reference signal, wherein a number of resource elements referenced by the configuration information of the resource pool is less than a number of resource elements in the subframe;
at least one processor; and
a non-transitory computer-readable storage medium storing a program to be executed by the at least one processor, the program including instructions for:
determining the resource pool based on a preset basic pattern or preset available resources, and based on the configuration information, wherein the preset basic pattern comprises a basic element, and the basic element comprises at least two resource elements that are adjacent in a time domain direction or a frequency domain direction.

16. The terminal device according to claim 15, wherein the preset basic pattern or the preset available resources are known in advance by the base station and the terminal device.

17. The terminal device according to claim 15, wherein:
the configuration information comprises a target multiple and a deviation value, wherein the target multiple is a first integer that is not zero (0), and the deviation value is a second integer that is not zero (0); and
the instructions for determining the resource pool based on the preset basic pattern and the configuration information comprise instructions for:
extending resources in the preset basic pattern in the time domain direction or the frequency domain direction by the target multiple, to obtain a basic resource pool; and
enabling the basic resource pool to deviate in the time domain direction or the frequency domain direction based on the deviation value, to obtain the resource pool.

18. The terminal device according to claim 15, wherein:
the configuration information comprises a first target multiple, a second target multiple, and a deviation value, wherein the first target multiple and the second target multiple are both integers that are not zero (0), and the deviation value is an integer that is not zero (0); and
the instructions for determining the resource pool based on the preset basic pattern and the configuration information comprise instructions for:

extending resources in the preset basic pattern in a first direction by the first target multiple, to obtain a first basic resource pool;

extending the first basic resource pool in a second direction by the second target multiple, to obtain a second basic resource pool, wherein the first direction is in a first domain direction, the first domain direction is the time domain direction or the frequency domain direction, and the second direction is another direction in the first domain direction that is different than the first direction; and enabling the second basic resource pool to deviate in the time domain direction or the frequency domain direction based on the deviation value, to obtain the resource pool.

19. The terminal device according to claim 18, wherein the first domain direction is the time domain direction.

20. The terminal device according to claim 15, wherein the preset available resources comprise all resources that can be used to transmit the downlink measurement reference signal in the subframe, and the configuration information of the resource pool indicates a location of the resource pool in the preset available resources.

21. The terminal device according to claim 15, wherein the configuration information of the resource pool is a bitmap.

* * * * *